United States Patent
Thomas et al.

(10) Patent No.: US 12,418,877 B2
(45) Date of Patent: Sep. 16, 2025

(54) CONFIGURING POSITIONING MEASUREMENTS AND REPORTS

(71) Applicant: Lenovo (Singapore) Pte. Ltd., New Tech Park (SG)

(72) Inventors: Robin Thomas, Bad Nauheim (DE); Ankit Bhamri, Rödermark (DE); Alexander Johann Maria Golitschek Edler von Elbwart, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 286 days.

(21) Appl. No.: 18/025,861

(22) PCT Filed: Sep. 10, 2021

(86) PCT No.: PCT/IB2021/058261
§ 371 (c)(1),
(2) Date: Mar. 10, 2023

(87) PCT Pub. No.: WO2022/054001
PCT Pub. Date: Mar. 17, 2022

(65) Prior Publication Data
US 2024/0027563 A1 Jan. 25, 2024

Related U.S. Application Data

(60) Provisional application No. 63/076,683, filed on Sep. 10, 2020, provisional application No. 63/076,575, filed on Sep. 10, 2020.

(51) Int. Cl.
*H04W 64/00* (2009.01)
*G01S 5/00* (2006.01)
(Continued)

(52) U.S. Cl.
CPC .......... *H04W 64/00* (2013.01); *G01S 5/0018* (2013.01); *H04B 17/254* (2023.05);
(Continued)

(58) Field of Classification Search
CPC ..... H04W 64/00; H04W 24/08; H04W 24/10; H04W 64/003; H04W 4/029;
(Continued)

(56) References Cited

U.S. PATENT DOCUMENTS 10,721,100 B2 * 7/2020 Kumar .................... H04W 4/02
10,871,545 B2 * 12/2020 Modarres Razavi ..... G01S 1/20
(Continued)

FOREIGN PATENT DOCUMENTS

WO 2011142715 A1 11/2011
WO 2018143859 A1 8/2018

OTHER PUBLICATIONS

PCT/IB2021/058262, "Notification of Transmittal of the International Search Report and the Written Opinion of the International Searching Authority, or the Declaration", Patent Cooperation Treaty, Dec. 3, 2021, pp. 1-12.
(Continued)

*Primary Examiner* — Kabir A Timory
(74) *Attorney, Agent, or Firm* — Kunzler Bean & Adamson

(57) ABSTRACT

Apparatuses, methods, and systems are disclosed for configuring positioning measurements and reports. One apparatus in a mobile communication network includes a transceiver that receives, from a mobile wireless communication network, a positioning configuration defining a positioning configuration timeline and a measurement and processing time window for the UE The apparatus includes a processor that performs at least one positioning measurement for the UE according to the positioning processing timeline in
(Continued)

response to receiving the positioning configuration. The transceiver sends a positioning measurement report comprising the at least one positioning measurement and measurement timeline performed of the at least one positioning measurement within the configured time window from the UE to the mobile wireless communication network.

20 Claims, 15 Drawing Sheets

(51) Int. Cl.
  H04B 17/20    (2015.01)
  H04B 17/318   (2015.01)
  H04L 5/00     (2006.01)
  H04W 24/08    (2009.01)
  H04W 24/10    (2009.01)
(52) U.S. Cl.
  CPC ......... *H04B 17/328* (2023.05); *H04L 5/0048* (2013.01); *H04W 24/08* (2013.01); *H04W 24/10* (2013.01); *H04W 64/003* (2013.01)
(58) Field of Classification Search
  CPC ... G01S 5/0018; H04B 17/254; H04B 17/328; H04L 5/0048
  See application file for complete search history.

(56) References Cited

U.S. PATENT DOCUMENTS

| 11,902,931 B2* | 2/2024 | Tao ................... H04W 24/10 |
| 2019/0253197 A1 | 8/2019 | Babaei et al. |
| 2023/0345408 A1 | 10/2023 | Thomas |

OTHER PUBLICATIONS

PCT/IB2021/058261, "Notification of Transmittal of the International Search Report and the Written Opinion of the International Searching Authority, or the Declaration", Patent Cooperation Treaty, Nov. 29, 2021, pp. 1-12.
Vivo, "Discussion on potential positioning enhancements", 3GPP TSG RAN WG1 #102-e R1-2005381, Aug. 17-28, 2020, pp. 1-20.
Qualcomm Inc., "Potential Enhancements for NR Rel-17 Positioning", 3GPP TSG RAN WG1 #102-e R1-2006810, Aug. 17-28, 2020, pp. 1-21.
Ericsson, "WF on impact of positioning on RRM requirements", 3GPP TSG-RAN WG4 Meeting # 94-e-Bis R4-2005379, Apr. 20-30, 2020, pp. 1-8.
Ericsson, "Email discussion summary for [95e][217] NR_pos_RRM_Part_3", 3GPP TSG-RAN WG4 Meeting # 95-e R4-2009029, May 25-Jun. 5, 2020, pp. 1-52.
3GPP, "3rd Generation Partnership Project; Technical Specification Group Services and System Aspects; Service requirements for cyber-physical control applications in vertical domains; Stage 1 (Release 17)", 3GPP TS 22.104 V17.3.0, Jul. 2020, pp. 1-76.
3GPP, "3rd Generation Partnership Project; Technical Specification Group Services and System Aspects; Service requirements for the 5G system; Stage 1 (Release 17)", 3GPP TS 22.261 V17.3.0, Jul. 2020, pp. 1-83.
3GPP, "3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.1.1, Jul. 2020, pp. 1-1078.
3GPP, "3rd Generation Partnership Project; Technical Specification Group Radio Access Network; LTE Positioning Protocol (LPP) (Release 16)", 3GPP TS 37.355 V16.1.0, Jul. 2020, pp. 1-292.
3GPP, "3rd Generation Partnership Project; Technical Specification Group Radio Access Network; NR; Requirements for support of radio resource management (Release 16)", 3GPP TS 38.133 V16.4.0, Jun. 2020, pp. 1-1463.
3GPP, "3rd Generation Partnership Project; Technical Specification Group Radio Access Network; NR; Physical layer measurements (Release 16)", 3GPP TS 38.215 V16.2.0, Jun. 2020, pp. 1-25.
3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.1.0, Jul. 2020, pp. 1-114.
3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.
Sony, "Initial Views on Evaluation of Positioning Accuracy and Latency", 3GPP TSG RAN WG1 #102-e R1-2005578, Aug. 17-28, 2020, pp. 1-9.
Lenovo, Motorola Mobility, "Considerations for Positioning Latency Evaluation", 3GPP TSG RAN WG1 #102-e R1-2006323, Aug. 17-28, 2020, pp. 1-6.

* cited by examiner

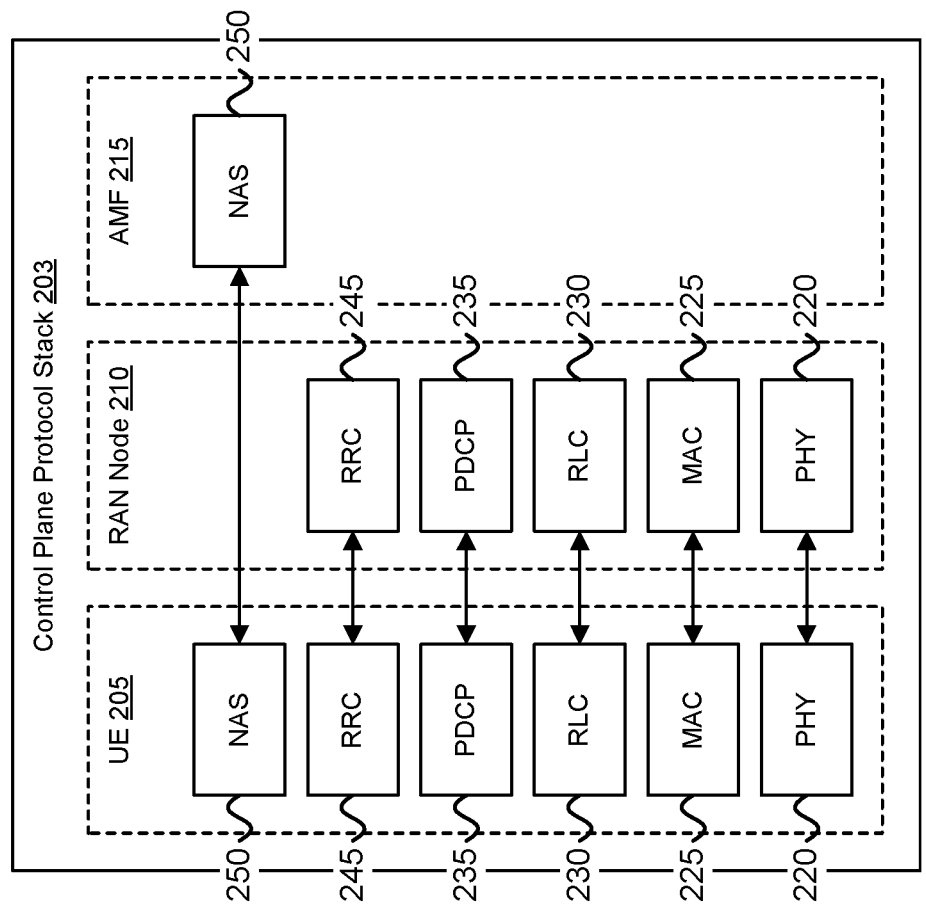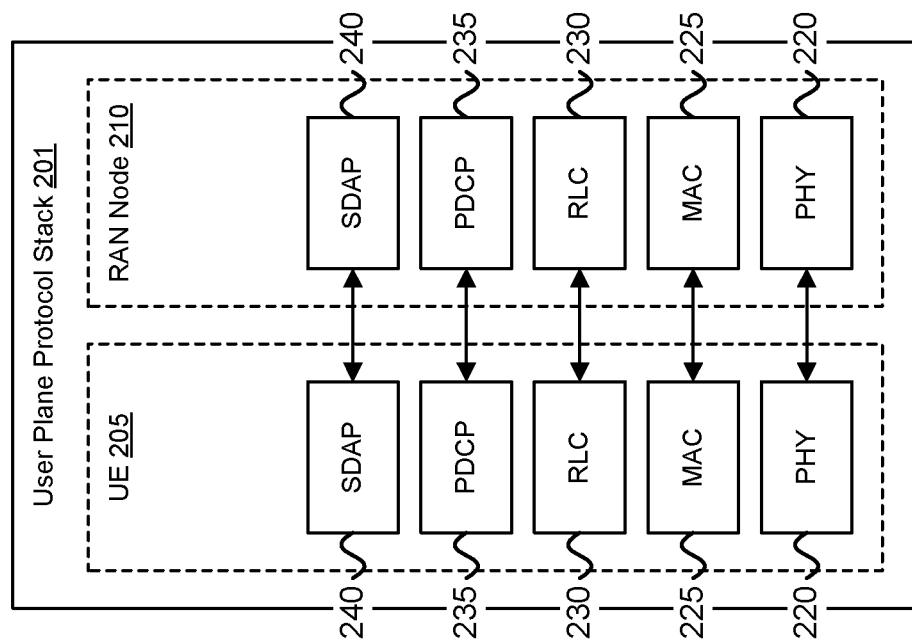
FIG. 2

DL-TDOA Assistance Data 400

```
-- ASN1START

NR-DL-TDOA-ProvideAssistanceData-r16 ::= SEQUENCE {
    nr-DL-PRS-AssistanceData-r16        NR-DL-PRS-AssistanceData-r16    OPTIONAL, -- Need ON
    nr-SelectedDL-PRS-IndexList-r16     NR-SelectedDL-PRS-IndexList-r16 OPTIONAL, -- Need ON
    nr-PositionCalculationAssistance-r16
                                        NR-PositionCalculationAssistance-r16
                                                                        OPTIONAL, -- Cond UEB
    nr-DL-TDOA-Error-r16                NR-DL-TDOA-Error-r16            OPTIONAL, -- Need ON
    ...
}

-- ASN1STOP
```

FIG. 4

```
                    DL-TDOA Measurement Report 500
-- ASN1START

NR-DL-TDOA-SignalMeasurementInformation-r16 ::= SEQUENCE {
    dl-PRS-ReferenceInfo-r16    DL-PRS-IdInfo-r16,
    nr-DL-TDOA-MeasList-r16     NR-DL-TDOA-MeasList-r16,
    ...
}

NR-DL-TDOA-MeasList-r16 ::= SEQUENCE (SIZE(1..nrMaxTRPs-r16)) OF
                            NR-DL-TDOA-MeasElement-r16

NR-DL-TDOA-MeasElemnt-r16 ::= SEQUENCE {
    trp-ID-r16                  TRP-ID-r16,
    nr-DL-PRS-ResourceId-r16    NR-DL-PRS-ResourceId-r16          OPTIONAL,
    nr-DL-PRS-ResourceSetId-r16 NR-DL-PRS-ResourceSetId-r16       OPTIONAL,
    nr-TimeStamp-r16            NR-TimeStamp-r16,
    nr-RSTD-r16                 CHOICE {
        k0-r16                  INTEGER (0..1970049),
        k1-r16                  INTEGER (0..985025),
        k2-r16                  INTEGER (0..492513),
        k3-r16                  INTEGER (0..246257),
        k4-r16                  INTEGER (0..123129),
        k5-r16                  INTEGER (0..61565),
        ...
    },
    nr-AdditionalPathList-r16   NR-AdditionalPathList-r16         OPTIONAL,
    nr-TimingQuality-r16        NR-TimingQuality-r16,
    nr-DL-PRS-RSRP-Result-r16   INTEGER (0..126)                  OPTIONAL,
    nr-DL-TDOA-AdditionalMeasurements-r16
                                NR-DL-TDOA-AdditionalMeasurements-r16  OPTIONAL,
    ...
}

NR-DL-TDOA-AdditionalMeasurements-r16 ::= SEQUENCE (SIZE (1..3)) OF
                                NR-DL-TDOA-AdditionalMeasurementElement-r16

NR-DL-TDOA-AdditionalMeasurementElement-r16 ::= SEQUENCE {
    nr-DL-PRS-ResourceId-r16    NR-DL-PRS-ResourceId-r16          OPTIONAL,
    nr-DL-PRS-ResourceSetId-r16 NR-DL-PRS-ResourceSetId-r16       OPTIONAL,
    nr-TimeStamp-r16            NR-TimeStamp-r16,
    nr-RSTD-ResultDiff-r16      CHOICE {
        k0-r16                  INTEGER (0..8191),
        k1-r16                  INTEGER (0..4095),
        k2-r16                  INTEGER (0..2047),
        k3-r16                  INTEGER (0..1023),
        k4-r16                  INTEGER (0..511),
        k5-r16                  INTEGER (0..255),
        ...
    },
    nr-TimingQuality-r16        NR-TimingQuality-r16,
    nr-DL-PRS-RSRP-ResultDiff-r16  INTEGER (0..61)                OPTIONAL,
    nr-AdditionalPathList-r16   NR-AdditionalPathList-r16         OPTIONAL,
    ...
}

-- ASN1STOP
```

FIG. 5

CONFIGURING POSITIONING MEASUREMENTS AND REPORTS

CROSS-REFERENCE TO RELATED APPLICATIONS

This application claims the benefit of U.S. Provisional Patent Application No. 63/076,683, entitled "UE PROCESSING ENHANCEMENTS FOR POSITIONING" and filed on Sep. 10, 2020, for Robin Thomas et al., and U.S. Provisional Patent Application No. 63/076,575, entitled "UE REPORTING ENHANCEMENTS FOR POSITIONING" and filed on Sep. 10, 2020, for Robin Thomas et al., which are incorporated herein by reference.

FIELD

The subject matter disclosed herein relates generally to wireless communications and more particularly relates to configuring positioning measurements and reports.

BACKGROUND

In certain wireless communication systems, Radio Access Technology ("RAT") dependent positioning using 3GPP New Radio ("NR") technology is supported in specifications. The specifications may define certain requirements for positioning measurements and reports, which may include accuracy, latency, and reliability positioning requirements.

BRIEF SUMMARY

Disclosed are procedures for configuring positioning measurements and reports. The procedures may be implemented by apparatus, systems, methods, or computer program products.

In one embodiment, an apparatus includes a transceiver that receives, from a mobile wireless communication network, a positioning configuration defining a positioning configuration timeline and a measurement and processing time window for the UE. The positioning configuration may include a timeline duration defining when to start performing measurements, a set of positioning measurements to be taken within the configured time window, and a window duration for measuring and processing requested position-relation measurements for the UE according to the positioning processing timeline.

In one embodiment, the apparatus includes a processor that performs at least one positioning measurement for the UE according to the positioning processing timeline in response to receiving the positioning configuration. In certain embodiments, the transceiver sends a positioning measurement report comprising the at least one positioning measurement and measurement timeline performed of the at least one positioning measurement within the configured time window from the UE to the mobile wireless communication network.

In one embodiment, another apparatus includes a transceiver that sends, to a User Equipment ("UE") device, a positioning configuration defining a positioning configuration timeline and a measurement and processing time window for the UE. In one embodiment, the positioning configuration comprising a timeline duration defining when to start performing measurements, a set of positioning measurements to be taken within the configured time window, and a window duration for measuring and processing requested position-relation measurements for the UE according to the positioning processing timeline. In one embodiment, the transceiver receives, from the UE device, a positioning measurement report comprising the at least one positioning measurement and measurement timeline of the at least one positioning measurement performed within the configured time window.

In one embodiment, another apparatus includes a transceiver that receives, from a mobile wireless communication network, an uplink ("UL") configured grant configuration based on criteria associated with at least one of a positioning latency budget and a positioning processing timeline for the UE. In some embodiments, the apparatus includes a processor that performs at least one positioning measurement for the UE according to the positioning processing timeline and generates a positioning measurement report comprising the at least one positioning measurement.

In certain embodiments, the transceiver sends the positioning measurement report to the mobile wireless communication network using the UL configured grant configuration based on an availability of positioning-related reference signal measurements within at least one of the positioning latency budget and the positioning processing timeline.

In one embodiment, another embodiment includes a transceiver that sends, to a User Equipment ("UE") device, an uplink ("UL") configured grant configuration based on criteria associated with at least one of a positioning latency budget and a positioning processing timeline for the UE and receives a positioning measurement report from the UE device using the UL configured grant configuration based on an availability of positioning-related reference signal measurements within at least one of the positioning latency budget and the positioning processing timeline.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a block diagram illustrating one embodiment of a 5G New Radio ("NR") protocol stack;

FIG. 4 is a diagram illustrating one embodiment of DL-TDOA Assistance Data;

FIG. 5 is a diagram illustrating one embodiment of DL-TDOA Measurement Report;

DETAILED DESCRIPTION

Figure 1:
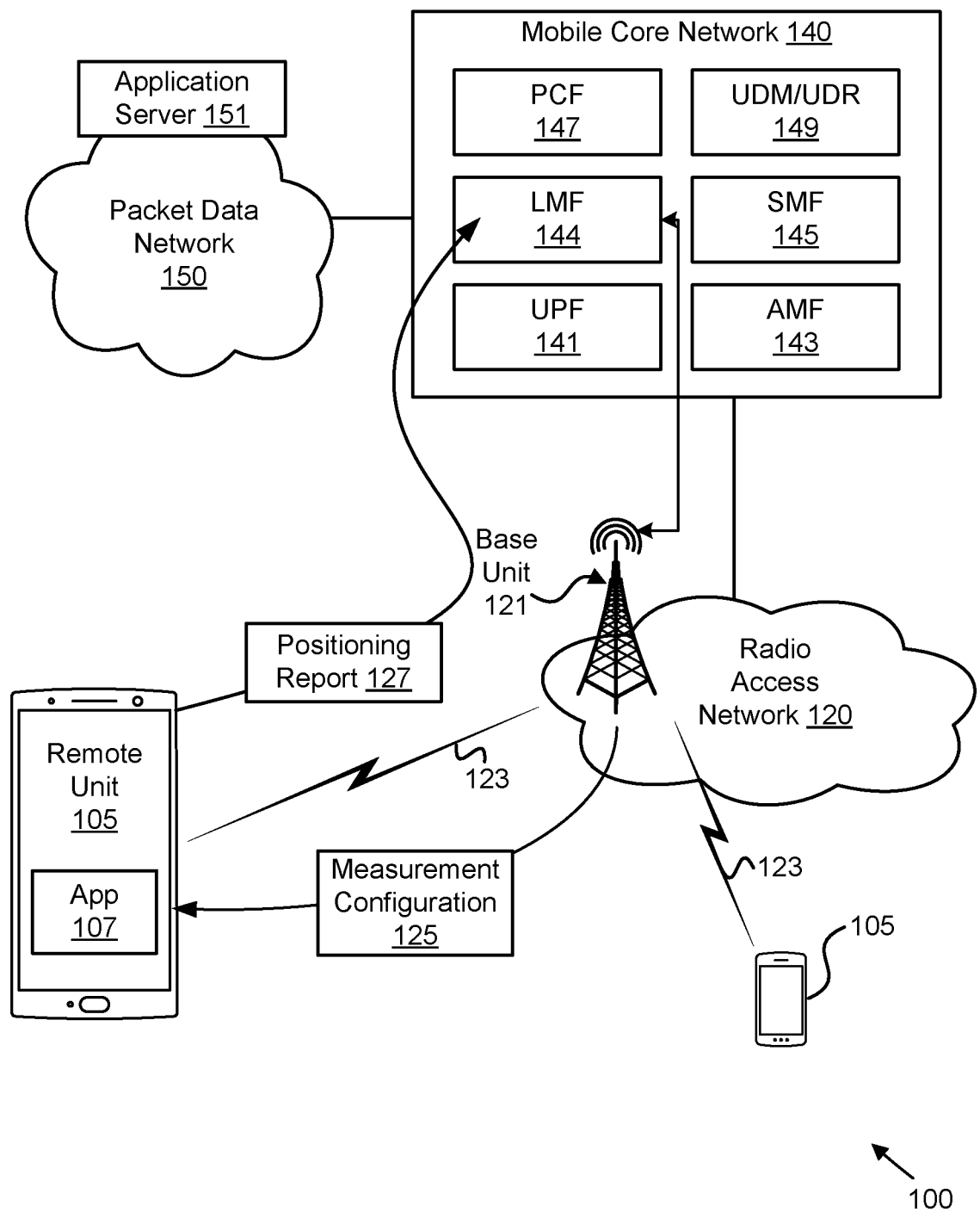
FIG. 1 is a schematic block diagram illustrating one embodiment of a wireless communication system for configuring positioning measurements and reports.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for configuring positioning measurements and reports. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

In one embodiment, the subject matter disclosed herein describes enhancements that address issues related to the UE processing timeline of downlink ("DL")-positioning reference signals ("PRS") and/or other related positioning-related reference signals. Different processing functionalities can address different latency and location accuracy requirements. In certain embodiments, there have been no proposed enhancements regarding UE processing timeline configurations for RAT-dependent positioning procedures including measurement and reporting of positioning-related reference signals.

In one embodiment, to satisfy the requirements of low latency positioning, it would be beneficial to define different UE processing timelines depending on target-UE's capabilities. A target-UE(s) in the context of this disclosure may refer to the UE(s) to be localized. The present disclosure aims to tackle this UE processing timeline issue for positioning and introduces new functionality to enable low-latency positioning. Furthermore, the UE positioning processing timeline may be applicable to UE-assisted and UE-based positioning methods. The subject matter herein also describes management of the UE processing timeline when a measurement gap is configured to the target-UE for the positioning purposes, which can also have an impact on the UE processing load.

In further embodiments, the subject matter disclosed herein describes enhancements that address the issues related to the high measurement and reporting latency of DL-PRS and/or other related positioning-related reference signals. Dynamic Layer-½ signaling can reduce the time required to process a measurement and report it to the location server. In certain embodiments, higher-layer non-access stratum ("NAS") LPP signaling is used to configure RAT-dependent measurement and reporting of positioning-related reference signals such as DL-PRS, which can be inefficient and incur high latency.

The delay between a UE receiving a DL-PRS measurement reporting configuration (e.g., in the case of UE-assisted positioning) or location estimate request (e.g., in the case of UE-based positioning) and the UE providing the said measurement report/location estimate to the location server, e.g., LMF, can be further optimized in order to reduce the overall positioning latency (Time-To-First-Fix).

The present disclosure, in one embodiment, provides mechanisms to enable dynamic signaling to reduce the overall positioning latency when processing the measurements and transmitting corresponding reports to location server. Uplink ("UL") configured grants for positioning may reduce the report transmission time, depending on the availability. Priority indications for measurement processing may also assist in ranking which measurement reports can be prioritized based on the UL resource availability. In order to enable efficient and low latency reporting of positioning-related reference signals, certain measurements may also be dropped based on a set of criteria, which is detailed in the disclosure.

For Release 17 ("Rel-17") of the 3GPP specification, the different positioning requirements are especially stringent with respect to accuracy, latency, and reliability. Table 1 shows positioning performance requirements for different scenarios in an Industrial IoT ("IIoT") or indoor factory setting. Note that augmented reality in smart factories may have a heading positioning performance requirements of <0.17 radians and mobile control panels with safety functions in smart factories (within factory danger zones) may have a heading positioning performance requirements of <0.54 radians.

nals based on at least one of a combination of following criteria:
    i. One or more UE capabilities such as for an enhanced mobile broadband ("eMBB") device or an ultra-reliable and low-latency communications ("URLLC") device including:
        1. Latency
        2. Device efficiency
    ii. Positioning accuracy requirements
    iii. Number of positioning measurement related quantities to be reported
    iv. Type of measurement to be processed In one embodiment, the present disclosure establishes and specifies requirements for processing position related measurements from a UE capability point of view where the different positioning timeline configurations accommodate different positioning latency requirements and UE capabilities.

TABLE 1

IIoT Positioning Performance Requirements

| Scenario | Horizontal accuracy | Vertical accuracy | Availability | Latency for position estimation of UE | UE Speed | Corresponding Positioning Service Level |
|---|---|---|---|---|---|---|
| Mobile control panels with safety functions (non-danger zones) | <5 m | <3 m | 90% | <5 s | N/A | Service Level 2 |
| Process automation - plant asset management | <1 m | <3 m | 90% | <2 s | <30 km/h | Service Level 3 |
| Flexible, modular assembly area in smart factories (for tracking of tools at the work-place location) | <1 m (relative positioning) | N/A | 99% | 1 s | <30 km/h | Service Level 3 |
| Augmented reality in smart factories | <1 m | <3 m | 99% | <15 ms | <10 km/h | Service Level 4 |
| Mobile control panels with safety functions in smart factories (within factory danger zones) | <1 m | <3 m | 99.9% | <1 s | N/A | Service Level 4 |
| Flexible, modular assembly area in smart factories (for autonomous vehicles, only for monitoring proposes) | <50 cm | <3 m | 99% | 1 s | <30 km/h | Service Level 5 |
| Inbound logistics for manufacturing (for driving trajectories (if supported by further sensors like camera, GNSS, IMU) of indoor autonomous driving systems)) | <30 cm (if supported by further sensors like camera, GNSS, IMU) | <3 m | 99.9% | 10 ms | <30 km/h | Service Level 6 |
| Inbound logistics for manufacturing (for storage of goods) | <20 cm | <20 cm | 99% | <1 s | <30 km/h | Service Level 7 |

The present disclosure provides enhancements to reduce the UE processing timeline for positioning-related reference signals with an emphasis on low-latency positioning. Note that for the purposes of this disclosure, a positioning-related reference signal may refer to a reference signal used for positioning procedures and/or purposes to estimate a target-UE's location, e.g., PRS or based on existing reference signals such as sounding reference signal ("SRS"). In one embodiment, a target-UE can be referred to as the device/entity to be localized.

In one embodiment, a method is disclosed to define processing timeline(s) for positioning-related reference sig- In one embodiment, a method is disclosed to determine the appropriate resources for using the configured grant or multiple UL grants for reporting the PRS-based measurements, e.g., UL resources required to report the ProvideLocation message. In such an embodiment, the instance from the time the measurements are available to report to obtaining the UL resource can be adapted and configured to enable low latency positioning.

In certain embodiments, a method is disclosed for prioritization of PRS measurement reports based on the availability of UL resources, UE processing timeline, and accuracy requirements. In such an embodiment, priority handling mechanisms enable the LMF to acquire the positioning measurements within the required duration based on configured positioning method, especially in the case of UE-assisted positioning methods.

In further embodiments, a method is disclosed for dropping measurement reports, based on a set of criteria, e.g., reports that are not transmitted within the required timeline and positioning latency budget. In such an embodiment, obsolete measurements do not need to be stored in the buffer, thus increasing efficiency of handling UE measurements.

FIG. 1 depicts a wireless communication system 100 for configuring positioning measurements and reports, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the base unit(s) 121 may provide a cell operating using a first frequency range and/or a cell operating using a second frequency range.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Location Management Function ("LMF") 144, a Unified Data Management function ("UDM") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The LMF 144 receives positioning measurements or estimates from RAN 120 and the remote unit 105 (e.g., via the AMF 143) and computes the position of the remote unit 105. The UDM is responsible for generation of Authentication and Key Agreement ("AKA") credentials, user identification handling, access authorization, subscription management. The UDR is a repository of subscriber information and may be used to service a number of network functions.

For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Policy Control Function ("PCF") (which provides policy rules to CP functions), a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

As discussed in greater detail below, the remote unit 105 receives a positioning measurement configuration 125 from the network (e.g., from the LMF 144 via RAN 120), including a positioning processing timeline for the remote unit 105 based on the remote unit's capabilities. The remote unit 105 performs positioning measurements, as described in greater detail below, and sends a positioning report to the LMF 144.

While FIG. 1 depicts components of a 5G RAN and a 5G core network, the described embodiments for configuring positioning measurements and reports apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station but it is replaceable by any other radio access node, e.g., gNB, ng-eNB, eNB, Base Station ("BS"), Access Point ("AP"), etc. Further, the operations are described mainly in the context of 5G NR. However, the proposed solutions/methods are also equally applicable to other mobile communication systems supporting configuring positioning measurements and reports.

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

In one embodiment, the following RAT-dependent positioning techniques may be supported by the system 100:

DL-TDoA: The DL TDOA positioning method makes use of the DL RS Time Difference ("RSTD") (and optionally DL PRS RS Received Power ("RSRP") of DL PRS RS Received Quality ("RSRQ")) of downlink signals received from multiple TPs, at the UE 205 (i.e., remote unit 105). The UE 205 measures the DL RSTD (and optionally DL PRS RSRP) of the received signals using assistance data received from the positioning server, and the resulting measurements are used along with other configuration information to locate the UE 205 in relation to the neighboring Transmission Points ("TPs").

DL-AoD: The DL Angle of Departure ("AoD") positioning method makes use of the measured DL PRS RSRP of downlink signals received from multiple TPs, at the UE 205. The UE 205 measures the DL PRS RSRP of the received signals using assistance data received from the positioning server, and the resulting measurements are used along with other configuration information to locate the UE 205 in relation to the neighboring TPs.

Multi-RTT: The Multiple-Round Trip Time ("Multi-RTT") positioning method makes use of the UE Receive-Transmit ("Rx-Tx") measurements and DL PRS RSRP of downlink signals received from multiple TRPs, measured by the UE 205 and the gNB Rx-Tx measurements (i.e., measured by RAN node 210) and UL SRS-RSRP at multiple TRPs of uplink signals transmitted from UE 205.

The UE 205 measures the UE Rx-Tx measurements (and optionally DL PRS RSRP of the received signals) using assistance data received from the positioning server, and the TRPs measure the gNB Rx-Tx measurements (and optionally UL SRS-RSRP of the received signals) using assistance data received from the positioning server. The measurements are used to determine the Round Trip Time ("RTT") at the positioning server which are used to estimate the location of the UE 205.

E-CID/NR E-CID: Enhanced Cell ID (CID) positioning method, the position of a UE 205 is estimated with the knowledge of its serving ng-eNB, gNB and cell and is based on LTE signals. The information about the serving ng-eNB, gNB and cell may be obtained by paging, registration, or other methods. NR Enhanced Cell ID (NR E CID) positioning refers to techniques which use additional UE measurements and/or NR radio resource and other measurements to improve the UE location estimate using NR signals.

Although NR E-CID positioning may utilize some of the same measurements as the measurement control system in the RRC protocol, the UE 205 generally is not expected to make additional measurements for the sole purpose of positioning; i.e., the positioning procedures do not supply a measurement configuration or measurement control message, and the UE 205 reports the measurements that it has available rather than being required to take additional measurement actions.

UL-TDoA: The UL TDOA positioning method makes use of the UL TDOA (and optionally UL SRS-RSRP) at multiple RPs of uplink signals transmitted from the UE 205. The RPs measure the UL TDOA (and optionally UL SRS-RSRP) of the received signals using assistance data received from the positioning server, and the resulting measurements are used along with other configuration information to estimate the location of the UE 205.

UL-AoA: The UL Angle of Arrival ("AoA") positioning method makes use of the measured azimuth and the zenith angles of arrival at multiple RPs of uplink signals transmitted from the UE 205. The RPs measure A-AoA and Z-AoA of the received signals using assistance data received from the positioning server, and the resulting measurements are used along with other configuration information to estimate the location of the UE 205.

Some UE positioning method supported in Rel-16 are listed in Table 2. The separate positioning techniques as indicated in Table 2 may be currently configured and performed based on the requirements of the LMF and/or UE capabilities. Note that Table 2 includes TBS positioning based on PRS signals, but only OTDOA based on LTE signals is supported. The E-CID includes Cell-ID for NR method. The Terrestrial Beacon System ("TBS") method refers to TBS positioning based on Metropolitan Beacon System ("MBS") signals.

TABLE 2

Supported Rel-16 UE positioning methods

| Method | UE-based | UE-assisted, LMF-based | NG-RAN node assisted | Secure User Plane Location ("SUPL") |
|---|---|---|---|---|
| A-GNSS | Yes | Yes | No | Yes (UE-based and UE-assisted) |
| OTDOA | No | Yes | No | Yes (UE-assisted) |
| E-CID | No | Yes | Yes | Yes for E-UTRA (UE-assisted) |
| Sensor | Yes | Yes | No | No |
| WLAN | Yes | Yes | No | Yes |
| Bluetooth | No | Yes | No | No |
| TBS | Yes | Yes | No | Yes (MBS) |
| DL-TDOA | Yes | Yes | No | No |
| DL-AoD | Yes | Yes | No | No |
| Multi-RTT | No | Yes | Yes | No |
| NR E-CID | No | Yes | FFS | No |
| UL-TDOA | No | No | Yes | No |
| UL-AoA | No | No | Yes | No |

The transmission of Positioning Reference Signals ("PRS") enables the UE 205 to perform UE positioning-related measurements to enable the computation of a UE's location estimate and are configured per Transmission Reception Point ("TRP"), where a TRP may transmit one or more beams.

Figure 3:
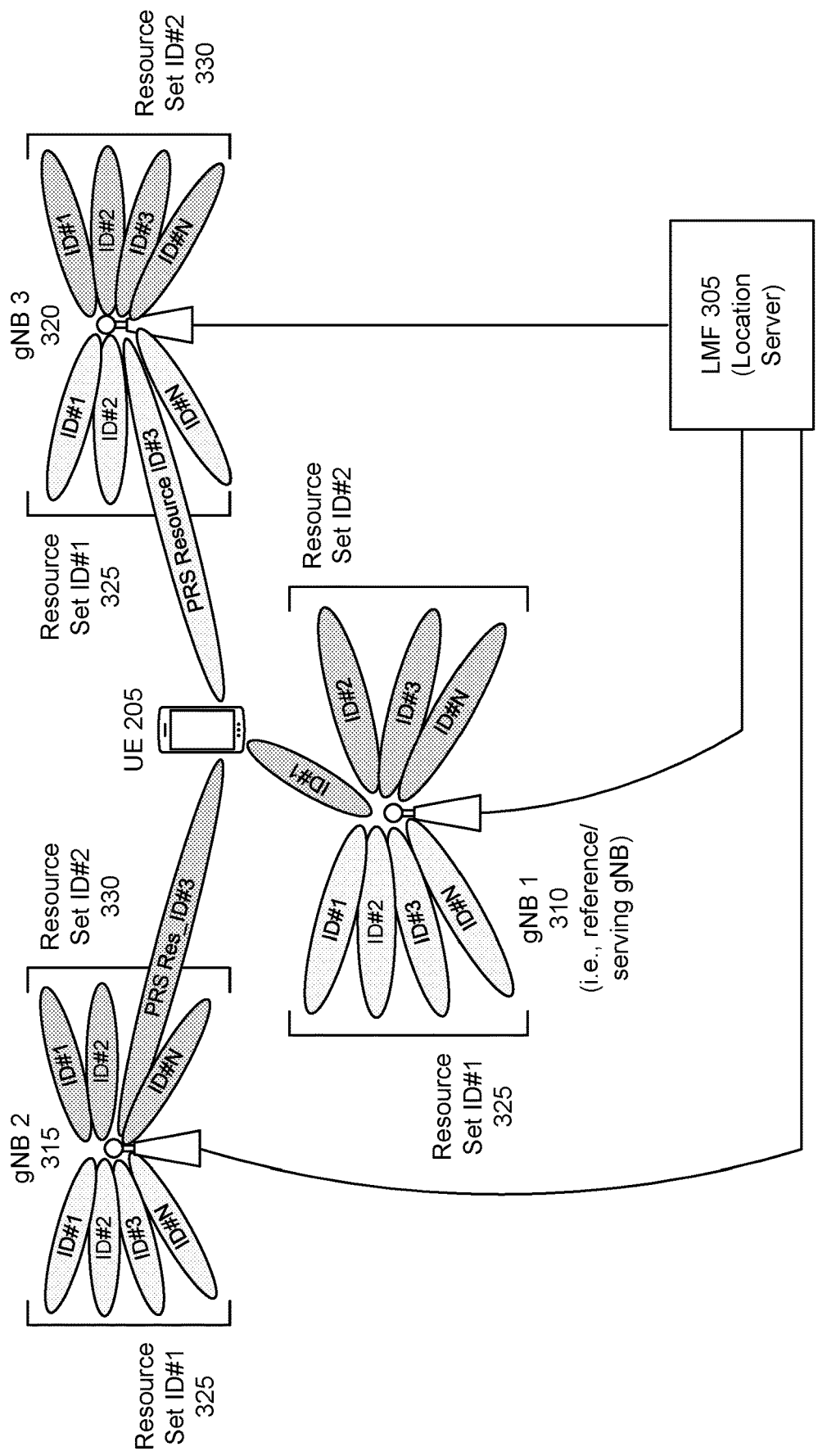
FIG. 3 is a diagram illustrating one embodiment of NR Beam-based Positioning.

FIG. 3 depicts a system 300 for NR beam-based positioning. According to Rel-16, the PRS can be transmitted by different base stations (serving and neighboring) using narrow beams over Frequency Range #1 Between ("FR1", i.e., frequencies from 410 MHz to 7125 MHz) and Frequency Range #2 ("FR2", i.e., frequencies from 24.25 GHz to 52.6 GHz), which is relatively different when compared to LTE where the PRS was transmitted across the whole cell.

As illustrated in FIG. 3, a UE 205 may receive PRS from a first gNB ("gNB #1) 310 which is a serving gNB, and also from a neighboring second gNB ("gNB #2) 315, and a neighboring third gNB ("gNB #3) 320. Here, the PRS can be locally associated with a PRS Resource ID and Resource Set ID for a base station (i.e., TRP). In the depicted embodiments, each gNB 310, 315, 320 is configured with a first Resource Set ID 325 and a second Resource Set ID 330. As depicted, the UE 205 receives PRS on transmission beams; here, receiving PRS from the gNB #1 310 on PRS Resource ID #1 from the second Resource Set ID 330, receiving PRS from the gNB #2 315 on PSR Resource ID #3 from the second Resource Set ID 330, and receiving PRS from the gNB #3 320 on PRS Resource ID #3 from the first Resource Set ID 325.

Similarly, UE positioning measurements such as Reference Signal Time Difference ("RSTD") and PRS RSRP measurements are made between beams as opposed to different cells as was the case in LTE. In addition, there are additional UL positioning methods for the network to exploit in order to compute the target UE's location. Table 3 lists the RS-to-measurements mapping required for each of the supported RAT-dependent positioning techniques at the UE, and Table 4 lists the RS-to-measurements mapping required for each of the supported RAT-dependent positioning techniques at the gNB.

TABLE 3

UE Measurements to enable RAT-dependent positioning techniques

| DL/UL Reference Signals | UE Measurements | To facilitate support of the following positioning techniques |
|---|---|---|
| Rel-16 DL PRS | DL RSTD | DL-TDOA |
| Rel-16 DL PRS | DL PRS RSRP | DL-TDOA, DL-AoD, Multi-RTT |
| Rel-16 DL PRS / Rel-16 SRS for positioning | UE Rx-Tx time difference | Multi-RTT |
| Rel. 15 SSB / CSI-RS for RRM | SS-RSRP(RSRP for RRM), SS-RSRQ (for RRM), CSI-RSRP (for RRM), CSI-RSRQ (for RRM), SS-RSRPB (for RRM) | E-CID |

TABLE 4 gNB Measurements to enable RAT-dependent positioning techniques

| DL/UL Reference Signals | gNB Measurements | To facilitate support of the following positioning techniques |
|---|---|---|
| Rel-16 SRS for positioning | UL RTOA | UL-TDOA |
| Rel-16 SRS for positioning | UL SRS-RSRP | UL-TDOA, UL-AoA, Multi-RTT |
| Rel-16 SRS for positioning, Rel-16 DL PRS | gNB Rx-Tx time difference | Multi-RTT |
| Rel-16 SRS for positioning, | A-AoA and Z-AoA | UL-AoA, Multi-RTT |

RAT-dependent positioning techniques involve the 3GPP RAT and core network entities to perform the position estimation of the UE, which are differentiated from RAT-independent positioning techniques which rely on Global Navigation Satellite System ("GNSS"), Inertial Measurement Unit ("IMU") sensor, WLAN and Bluetooth technologies for performing target device (i.e., UE) positioning.

Regarding PRS design, for 3GPP Rel-16, a DL PRS Resource ID in a DL PRS Resource set is associated with a single beam transmitted from a single TRP. Note that a TRP may transmit one or more beams. A DL PRS occasion is one instance of periodically repeated time windows (consecutive slot(s)) where DL PRS is expected to be transmitted. With regards to Quasi Co-Location ("QCL") relations beyond Type-D of a DL PRS resource, support one or more of the following QCL options:

QCL Option 1: QCL-TypeC from a Synchronization Signal Block ("SSB") from a TRP.
QCL Option 2: QCL-TypeC from a DL PRS resource from a TRP.
QCL Option 3: QCL-TypeA from a DL PRS resource from TRP.
QCL Option 4: QCL-TypeC from a Channel State Information Reference Signal ("CSI-RS") resource from a TRP.
QCL Option 5: QCL-TypeA from a CSI-RS resource from a TRP.
QCL Option 6: No QCL relation beyond Type-D is supported.

Note that QCL-TypeA refers to Doppler shift, Doppler spread, average delay, delay spread; QCL-TypeB refers to Doppler shift, Doppler spread'; QCL-TypeC refers to Average delay, Doppler shift; and QCL-TypeD refers to Spatial Rx parameter.

For a DL PRS resource, QCL-TypeC from an SSB from a TRP (QCL Option 1) is supported. An ID is defined that can be associated with multiple DL PRS Resource Sets associated with a single TRP. An ID is defined that can be associated with multiple DL PRS Resource Sets associated with a single TRP. This ID can be used along with a DL PRS Resource Set ID and a DL PRS Resources ID to uniquely identify a DL PRS Resource. Each TRP should only be associated with one such ID.

DL PRS Resource IDs are locally defined within DL PRS Resource Set. DL PRS Resource Set IDs are locally defined within TRP. The time duration spanned by one DL PRS Resource set containing repeated DL PRS Resources should not exceed DL-PRS-Periodicity. Parameter DL-PRS-ResourceRepetitionFactor is configured for a DL PRS Resource Set and controls how many times each DL-PRS Resource is repeated for a single instance of the DL-PRS Resource Set. Supported values include: 1, 2, 4, 6, 8, 16, 32.

As related to NR positioning, the term "positioning frequency layer" refers to a collection of DL PRS Resource Sets across one or more TRPs which have:
The same SCS and CP type
The same center frequency
The same point-A (already agreed)
All DL PRS Resources of the DL PRS Resource Set have the same bandwidth
All DL PRS Resource Sets belonging to the same Positioning Frequency Layer have the same value of DL PRS Bandwidth and Start PRB Duration of DL PRS symbols in units of ms a UE can process every T ms assuming 272 PRB allocation is a UE capability.

RRC signaling may be introduced for a UE to request a measurement gap configuration when the UE is expected to measure the DL PRS resource outside the active DL BWP. In case DL PRS Resources are processed in the active BWP and there is no measurement gap configured to the UE, at least in FR2, the UE may not be expected to process DL PRS in the same OFDM symbol where other DL signals and channels are transmitted to the UE. Behavior in FR1 is determined by RAN4.

In one embodiment, configured DL PRS are transmitted on DL symbols of a slot configured by higher layers. In further embodiments, configured DL PRS are transmitted on symbols of slot configured as flexible symbols by higher layers. In certain embodiments, if the UE is not provided with a measurement gap, the UE is not expected to process DL PRS Resources on serving or neighboring cells on symbols indicated as UL by the serving cell.

In one embodiment, for UE DL PRS processing capability, the UE reports one combination of (N, T) values per band, where N is a duration of DL PRS symbols in ms processed every T ms for a given maximum bandwidth (B) in MHz supported by UE. Additionally, the UE may report new parameters—a number of DL PRS resources that UE can process in a slot, which is reported per SCS per band. The values of which may include 1, 2, 4, 8, 12, 16, 32, 64.

In one embodiment, the following sets of values for N, T and B are supported: N={0.125, 0.25, 0.5, 1, 2, 4, 8, 12, 16, 20, 25, 30, 35, 40, 45, 50} ms, T={8, 16, 20, 30, 40, 80, 160, 320, 640, 1280} ms, and maximum BW reported by UE={5, 10, 20, 40, 50, 80, 100, 200, 400} MHz.

When a UE is configured in the assistance data of a positioning method with a number of PRS resources beyond its capability (FG 13-2,13-3,13-4 for AoD, TDOA, MRTT respectively), the UE assumes the DL-PRS Resources in the assistance data are sorted in a decreasing order of measurement priority. Specifically, in one embodiment, according to the current RAN2 structure of the assistance data, the following priority is assumed:
The 4 frequency layers are sorted according to priority;
The 64 TRPs per frequency layer are sorted according to priority;
The 2 sets per TRP of the frequency layer are sorted according to priority; and
The 64 resources of the set per TRP per frequency layer are sorted according to priority.

In one embodiment, the reference indicated by nr-DL-PRS-ReferenceInfo-r16 for each frequency layer has the highest priority at least for DL-TDOA.

In some embodiments, the terms antenna, panel, and antenna panel are used interchangeably. An antenna panel may be a hardware that is used for transmitting and/or receiving radio signals at frequencies lower than 6GHz, e.g., frequency range 1 (FR1), or higher than 6GHz, e.g., frequency range 2 (FR2) or millimeter wave (mmWave). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device (e.g., UE, node) antenna panel may be a physical or logical antenna array comprising a set of antenna elements or antenna ports that share a common or a significant portion of an RF chain (e.g., in-phase/quadrature ("I/Q") modulator, analog to digital ("A/D") converter, local oscillator, phase shift network). The device antenna panel or "device panel" may be a logical entity with physical device antennas mapped to the logical entity.

The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" may be transparent to the RAN node. For certain condition(s), the RAN node 210 can assume the mapping between device's physical antennas to the logical entity "device panel" may not be changed. For example, the condition may include until the next update or report from device or comprise a duration of time over which the RAN node assumes there will be no change to the mapping.

A device may report its capability with respect to the "device panel" to the RAN node or network. The device capability may include at least the number of "device panels." In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

Two antenna ports may be quasi-located with respect to a subset of the large-scale properties and different subset of large-scale properties may be indicated by a Quasi-Co-Location ("QCL") Type. For example, the parameter qcl-Type may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}.

Spatial Rx parameters may include one or more of: Angle of Arrival ("AoA"), Dominant AoA, average AoA, angular spread, Power Angular Spectrum ("PAS") of AoA, average Angle of Departure ("AoD"), PAS of AoD, transmit/receive channel correlation, transmit/receive beamforming, spatial channel correlation etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state associated with a target transmission can indicate parameters for configuring a quasi-collocation relationship between the target transmission (e.g., target RS of DM-RS ports of the target transmission during a transmission occasion) and a source reference signal(s) (e.g., SSB/CSI-RS/SRS) with respect to QCL type parameter(s) indicated in the corresponding TCI state. A device can receive a configuration of a plurality of transmission configuration indicator states for a serving cell for transmissions on the serving cell.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter/beam used for reception the reference RS (e.g., DL RS such as SSB/CSI-RS). In another example, the device may transmit the target transmission with the same spatial domain transmission filter/beam used for the transmission of the reference RS (e.g., UL RS such as SRS). A device can receive a configuration of a plurality of spatial relation information configurations for a serving cell for transmissions on the serving cell.

Regarding physical layer latency, start and end times may be defined as shown in Table 5 below:

TABLE 5

Physical Layer Latency Start and End times

| Method | Start | End |
| --- | --- | --- |
| UE assisted DL-only & DL-ECID & Multi-RTT | Transmission of the PDSCH from the gNB carrying the LPP Request Location Information message | Successful decoding of the PUSCH carrying the LPP Provide Location Information message |
| UL-only method & UL ECID & Multi-RTT | Reception by the gNB of the NRPPa measurement request message | The transmission by the gNB of the NRPPa measurement response message |
| UE-based | Transmission of the PDSCH from the gNB carrying the LPP Request Location Information if applicable, otherwise, Alt. 1: transmission of the PUSCH carrying the MG Request from the UE. Alt. 2: Transmission of the PDSCH from the gNB carrying the LPP message | Successful decoding of the PUSCH at gNB carrying the LPP Provide Location Information message if applicable, otherwise Calculation of Location Estimate at the UE |

TABLE 5-continued

Physical Layer Latency Start and End times

| Method | Start | End |
|---|---|---|
| | containing the assistance data<br>Alt. 3: Start of the Reception of DL PRS<br>Note: Suggest to downselect this at the next meeting.<br>Note: The high layers latency components may be subject to adjustment for different alternatives. | |

In one embodiment, physical layer latency for DL only, UL only, DL+UL positioning solutions for UE-based and UE-assisted approaches are separately defined. In certain embodiments, at least the following information is provided for positioning physical layer latency analysis:
  Source initiating request for positioning measurements/location for a given UE (UE, Network)
  Destination awaiting for positioning measurements/location for a given UE (UE, Network)
  Start and end triggers/events for physical layer latency evaluation, which, for Rel.16 solutions, is based on specification for each solution
  Initial and final RRC State of positioned UE (RRC IDLE, INACTIVE, CONNECTED) at the start and end time for the physical layer latency evaluation
  Positioning
    a. technique (enumeration): (1) DL-TDOA, (2) DL AoD, (3) UL-TDoA, (4) UL-AoA, (5) Multi-RTT, (6) E-CID
    b. type: DL, UL, DL+UL
    c. mode: UE-based, UE-assisted
  Latency component w/value range and description, including information on any parallel (simultaneous) components
  Total latency value In one embodiment, semi-persistent and aperiodic transmission, and reception of DL PRS is used, which may include UE-assisted and/or UE-based positioning and DL positioning and/or Multi-RTT.

In one embodiment, on-demand transmission, and reception of DL PRS is used, which may include UE-assisted and/or UE-based positioning and DL positioning and/or Multi-RTT. As used herein, semi-persistent means MAC-CE triggered, aperiodic corresponds to DCI-triggered, and on-demand corresponds to the UE-initiated or network-initiated request of PRS and/or SRS. Thus, in one embodiment, it is not the same as whether PRS is DCI-triggered or MAC-CE triggered; rather, it is about UE or LM requesting/suggesting/recommending specific PRS patterns, ON/OFF, periodicity, BW, and/or the like.

Regarding RAN4 positioning, in one embodiment, Rel-15 measurement gap ("MG") patterns are applicable for positioning measurements. If new MG patterns are introduced, the new MG patterns are UE capability. In one embodiment, the handling of LTE PRS in Rel-15 CSSF for gap sharing between NR PRS and RRM is re-used.

In some embodiments regarding the PRS measurement period when incomplete PRS measurement in active BWP is abandoned and restarted in gaps, additional requirements are not defined, but capture the above UE behavior in the relevant requirements for positioning measurement being performed within the active BWP.

In certain embodiments, for a UE that does not need any PRS and/or RRM measurement relaxation due to concurrent processing of PRS and RRM measurements, and for a UE that needs PRS and/or RRM measurement relaxation due to concurrent processing of PRS and RRM measurements, UE capability signaling may indicate that the concurrent processing of PRS and RRM measurements does not need any PRS and/or RRM measurement relaxation.

In addition to Rel-15 measurement gap patterns, RAN4 introduces in Rel-16 new measurement gap patterns applicable for UEs configured with NR positioning measurements, including that the number of the new measurement gap patterns is two and the new measurement gap patterns are UE capability.

In one embodiment, UEs may support the measurement gap patterns listed in Table 6. The UE may determine measurement gap timing based on a gap offset configuration and measurement gap timing advance configuration provided by higher layer signaling.

TABLE 6

Measurement Gap Pattern Configurations

| Gap Pattern Id | Measurement Gap Length (MGL, ms) | Measurement Gap Repetition Period (MGRP, ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |
| 24 | 10 | 80 |
| 25 | 20 | 160 |

In one embodiment, regarding measurement and report configuration, UE measurements have been defined, which are applicable to DL-based positioning techniques.

FIG. 4 depicts one example of an Information Element 400, i.e., NR-DL-TDOA-ProvideAssistanceData, used by the location server to provide an assistance data configuration to enable UE-assisted and UE-based NR downlink TDOA. The depicted Information Element ("IE") may also be used to provide NR DL TDOA positioning specific error reason.

FIG. 5 shows one example of an Information Element 500, i.e., NR-DL-TDOA-SignalMeasurementInformation, used by the target device (i.e., UE 205) to provide NR-DL TDOA measurements to the location server. The measurements are provided as a list of TRPs, where the first TRP in the list is used as reference TRP in case RSTD measurements are reported. The first TRP in the list may or may not be the reference TRP indicated in the NR-DL-PRS-AssistanceData. Furthermore, the target device selects a reference resource per TRP, and compiles the measurements per TRP based on the selected reference resource.

Regarding RAT-dependent positioning measurements, the different DL measurements including DL PRS-RSRP, DL RSTD and UE Rx-Tx Time Difference required for the supported RAT-dependent positioning techniques. The following measurement configurations are specified:

- 4 Pair of DL RSTD measurements can be performed per pair of cells. Each measurement is performed between a different pair of DL PRS Resources/Resource Sets with a single reference timing.
- 8 DL PRS RSRP measurements can be performed on different DL PRS resources from the same cell.

TABLE 7

| DL Measurements required for DL-based positioning methods | |
| --- | --- |
| DL PRS reference signal received power (DL PRS-RSRP) | |
| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth. For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency, RRC CONNECTED inter-frequency |
| DL reference signal time difference (DL RSTD) | |
| Definition | DL reference signal time difference (DL RSTD) is the DL relative timing difference between the positioning node j and the reference positioning node i, defined as $T_{SubframeRxj} - T_{SubframeRxi}$, Where: $T_{SubframeRxj}$ is the time when the UE receives the start of one subframe from positioning node j. $T_{SubframeRxi}$ is the time when the UE receives the corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency RRC_CONNECTED inter-frequency |
| UE Rx-Tx time difference | |
| Definition | The UE Rx-Tx time difference is defined as $T_{UE-RX} - T_{UE-TX}$ Where: $T_{UE-RX}$ is the UE received timing of downlink subframe #i from a positioning node, defined by the first detected path in time. $T_{UE-TX}$ is the UE transmit timing of uplink subframe #j that is closest in time to the subframe #i received from the positioning node. Multiple DL PRS resources can be used to determine the start of one subframe of the first arrival path of the positioning node. For frequency range 1, the reference point for $T_{UE-RX}$ measurement shall be the Rx antenna connector of the UE and the reference point for $T_{UE-TX}$ measurement shall be the Tx antenna connector of the UE. For frequency range 2, the reference point for $T_{UE-RX}$ measurement shall be the Rx antenna of the UE and the reference point for $T_{UE-TX}$ measurement shall be the Tx antenna of the UE. |

TABLE 7-continued

| DL Measurements required for DL-based positioning methods | |
| --- | --- |
| Applicable for | RRC_CONNECTED intra-frequency RRC_CONNECTED inter-frequency |

The present embodiments include techniques to enable configurations related to a UE's positioning processing capabilities and UL resource availability to enable positioning in a variety of latency and accuracy scenarios, including low latency and high accuracy positioning. Note that these embodiments can be used in combination with one another depending on the implementation.

In a first embodiment, the UE processing timeline of DL-based positioning methods is discussed, which requires measurements pertaining to the DL-PRS in order to obtain the target-UE's location estimate, e.g., RSTD, UE Rx-Tx Time Difference, DL-PRS RSRP. In this aspect, the presented solutions are tailored towards UE-assisted (location estimate is computed at the LMF) and UE-based (location estimate is locally computed at the UE) positioning.

Figure 6:
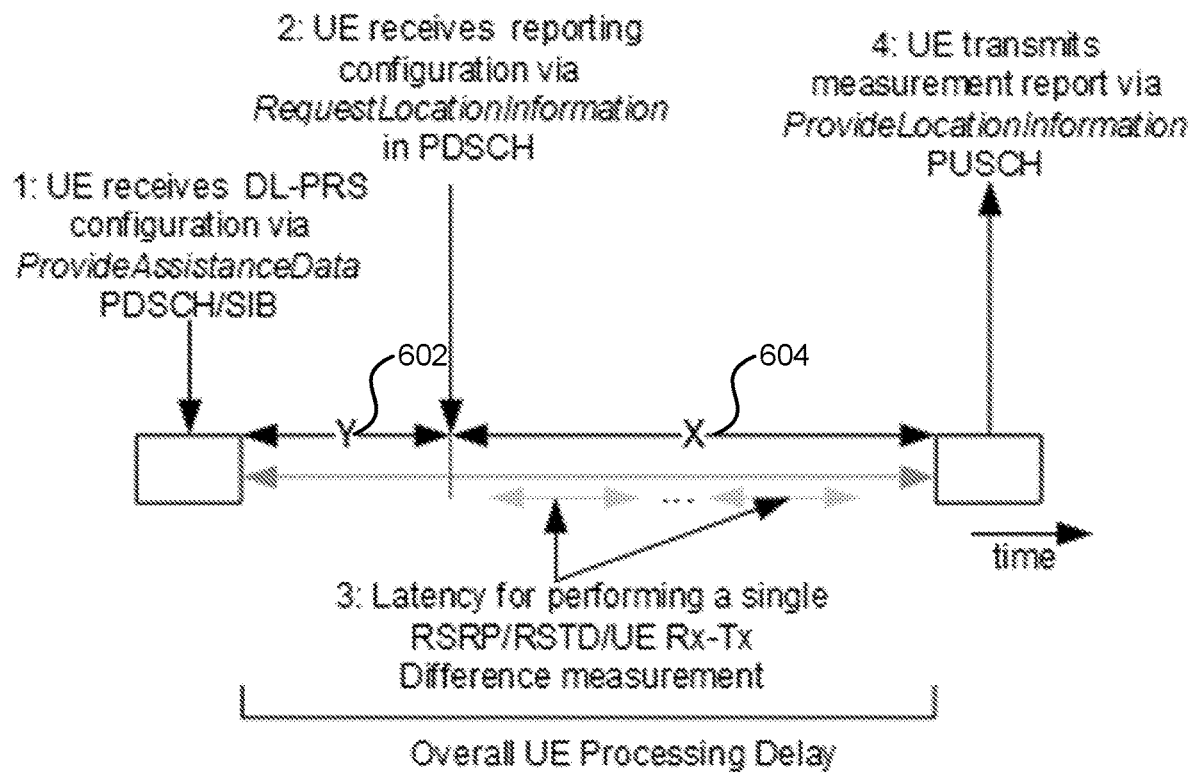
FIG. 6 is a diagram illustrating one embodiment of UE-assisted Positioning for configuring, measuring, and processing positioning measurements and sending reports.

In one embodiment, UE-assisted positioning involves signaling exchanges among the serving gNB, target-UE and finally LMF, in determining the location estimate. FIG. 6 illustrates the systematic procedures for target-UE performing positioning in a scenario where the PRS is processed within a DL BWP.

The UE processing timeline is measured from the time instance that the target-UE receives the DL-PRS physical layer configuration to the time instance that the target-UE transmits the measurement report to the serving gNB. It can be noted that in FIG. 6:

Y parameter 602 defines the duration between the UE receiving the DL-PRS configuration in the ProvideAssistanceData message and receiving the RequestLocationInformation message containing the measurement configuration including measurements and number to be reported.

X parameter 604 defines the duration between the UE receiving the RequestLocationInformation message and the UE transmitting the ProvideLocationInformation message containing the measurement report.

In one embodiment, the Y duration 602 mainly depends on when the UE receives the DL-PRS configuration (e.g., via broadcast or dedicated signaling), which can occur when the UE is in either the RRC_IDLE/INACTIVE or RRC_CONNECTED state. Depending on the time instance when Step (2) has been triggered, the target-UE may store the DL-PRS configuration for period defined by Y 602, which can vary depending on the target-UE state.

The X duration 604 is dependent on the configured positioning method by the LMF and number of measurements to be performed, as noted in Table 8. Table 8 further indicates the maximum number of supported measurements per target-UE. The X duration 604 is not limited to the techniques indicated in Table 8 but may also correspond to any positioning method and corresponding measurements configured by the location server.

TABLE 8

Maximum number of measurements per configured positioning technique

| DL-based Positioning Technique | Measurement Report Type | Maximum Number of Measurements |
|---|---|---|
| DL-AoD | DL-PRS RSRP measurements on different PRS resources from the same TRP supported by the UE | 8 |
| DL-TDOA | DL-PRS RSTD Measurement Report | 4 |
|  | DL-PRS RSRP Measurement | 8 |
| Multi-RTT | UE Rx-Tx Measurement Report | 4 |
|  | DL-PRS RSRP Measurement | 8 |

In an alternate embodiment, the UE receives the DL-PRS configuration and corresponding reporting configuration together. In this scenario, a combined processing timeline could be assumed that includes processing the configuration, performing the DL-PRS measurements, and processing the report.

The LMF 144 can configure a set of X 604 (and Y 602) values for the UE depending on the following factors:

UE capability of the UE: Reduced capability positioning UEs, will have relaxed timing requirements when compared to UEs with enhanced capabilities.

Positioning Latency Budget: The positioning service would have a relaxed to stringent Time-to-Find-First-Fix ("TTFF").

Accuracy requirement: Depending on the number of measurements to be performed within the X time window, the positioning accuracy may be low or high.

The X and Y values 602, 604 can depend on the required positioning latency budget required by an LCS client or application function. The UE processing configuration can be signaled in at least one of the following methods:

Via dedicated signaling for UE-specific processing timeline configurations, depending on e.g., latency budget of the positioning service.

a. Relaxed latency requirements may use LPP signaling b. Stringent latency requirements may use dynamic L1/L2 signaling such as DCI/MAC CE/RRC signaling Via system information broadcast signaling, e.g., SIB/on-demand signaling for a set of UEs with the shared aforementioned criteria.

In one example implementation, when the UE is configured to report measurement quantities related to DL-TDOA, then depending up on the UE processing capability, two embodiments can be considered:

In one embodiment, the UE is able to process both DL-PRS RSTD measurements and DL-PRS RSRP measurements at the same time such that the processing timeline X is comprised of a single value.

In another embodiment, the UE is able to process DL-PRS RSTD measurements and DL-PRS RSRP measurements in a sequential manner such that the processing timeline X can be composed of two timelines X1 and X2, respectively.

Figure 7:
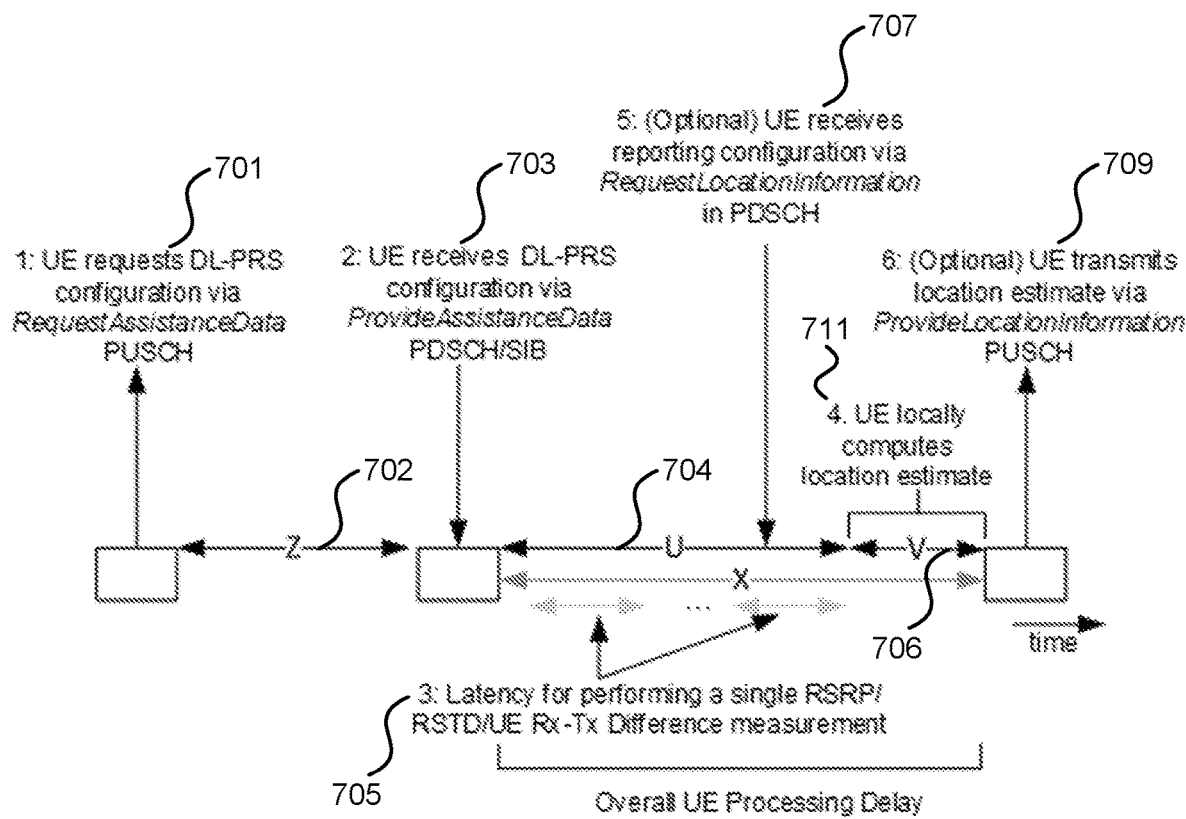
FIG. 7 is a diagram illustrating one embodiment of UE-based Positioning for configuring, measuring, and processing positioning measurements and sending reports.

FIG. 7 illustrates the procedures related to UE-based positioning and the corresponding UE processing timeline associated with such procedures. Similar to the embodiment shown in FIG. 6, the DL-PRS is also processed within a DL-BWP.

In the case of UE-based positioning, in one embodiment, the target-UE must initiate Step 1 if there is:

no prior DL-PRS physical layer configuration stored in the UE, existing DL-PRS configuration is outdated, or if the existing DL-PRS configuration does not match the accuracy requirements.

Duration Z 702 between Steps (1) 701 and (2) 703, in one embodiment, depends on the scheduling latency of the LMF to provide the desired measurement configuration. Steps (2) 703 and (3) 705 are similar to the embodiment depicted in FIG. 6, in that the UE processing delay is dependent on the duration between the instance that the UE receives the DL-PRS physical layer configuration and the instance that the required number of measurements have been gathered (given by U 704). V 706 is the processing duration to compute the location estimate at the target-UE. Steps (5) 707 and (6) 709 are optionally required if the LMF 144 would like the target-UE's location to estimate to be reported and therefore may not affect the target-UE's positioning processing timeline, unlike in the embodiment shown in FIG. 6 where Step (3) has a direct impact on the UE's processing timeline. Similarly, in Step (4) 711, the target-UE may locally compute a location estimate based on the positioning measurements.

In further embodiments, the measurement of a DL-PRS configuration extends to outside an active DL BWP of a serving cell and requires DL-PRS measurements of a TRP from a neighboring cell for enhanced accuracy positioning. However, in order to measure the DL-PRS resources outside an DL BWP of a serving cell/frequency, in one embodiment, a measurement gap would have to be configured at the target-UE, which can be provided to the UE or be provided upon request. This may add to the UE processing load and delay. At present, there are few issues in Rel-16 positioning to be considered with respect to the UE positioning processing capability:

RRM and Positioning Measurement Gap configuration are shared and thus the time-frequency location of the DL-PRS resources must be within the same SMTC window as the SSBs of the corresponding non-serving cell to be measured.

The UE processing timeline is impacted by the Measurement Gap Length ("MGL") and may not be optimized for reducing positioning latency.

There is a delay associated with the target-UE receiving the measurement gap ("MG") configuration (e.g., via RRC) and subsequent application of this configuration.

Figure 8:
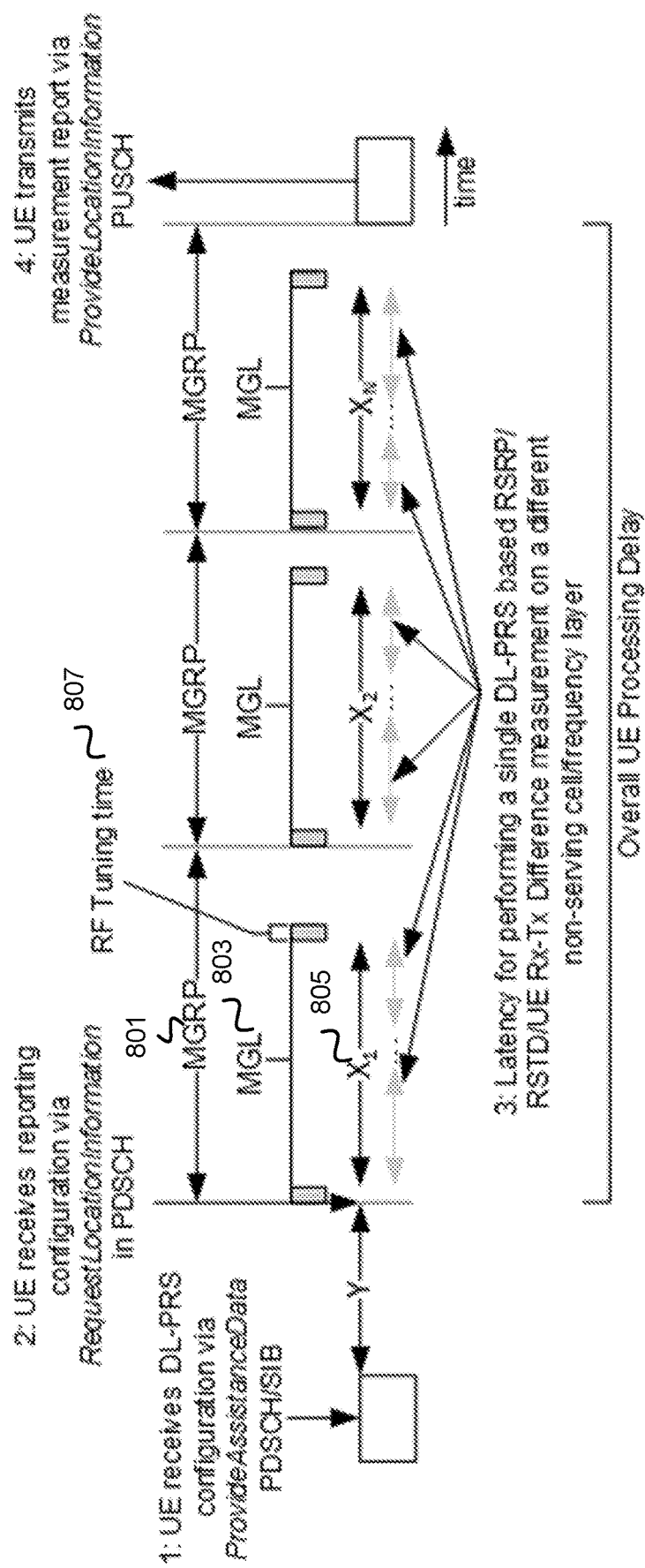
FIG. 8 is a diagram illustrating one embodiment of UE positioning processing timeline with MG configuration for configuring, measuring, and processing positioning measurements and sending reports.

FIG. 8 illustrates the impact of the MG configuration on the UE positioning processing timeline, which is associated with an MGL 803 and a Measurement Gap Repetition Period ("MGRP") 801. The delay associated with requesting and/or receiving an MG configuration is not shown.

In the case of both RRM and positioning, in one embodiment, a per-UE or per-FR MG can be configured. This implies that the MGL 803 should accommodate an SMTC and PRS occasion. A trade-off exists between the UE processing load and the length and periodicity of MGRP 801 to accommodate PRS occasions to be measured for high accuracy positioning. The RF tuning time 807 at the start and end of the MGL is also shown to contribute to the MGL 803.

The depicted embodiment presents a hybrid MG configuration for positioning where {X1, X2, . . . , XN} 805 can be adapted based on the set of criteria, as mentioned in the embodiment depicted in FIG. 6:

Capability of the UE: Reduced capability positioning UEs, will have relaxed timing requirements when compared to UEs with enhanced capabilities.

Positioning Latency Budget: The positioning service would have a relaxed to stringent Time-to-Find-First-Fix ("TTFF").

Accuracy requirement: Depending on the number of measurements to be performed within the X time window, the positioning accuracy may be low or high.

In further embodiments, for a target UE, PRS processing unit ("PPU") is proposed such that the processing capability for that UE could be defined in terms of number of PPUs it could support for a given symbol to process the PRS measurements and reports. Furthermore, for each type of PRS measurement and reporting, UE capability may be defined in terms of number of PPUs required to process corresponding report.

In one example implementation of this embodiment, when a UE is configured to report measurements for DL-TDOA and the UE is capable of M PPUs, then if DL-PRS RSTD requires N PPUs in a symbol, the remaining M-N PPUs may be used for DL-PRS RSRP, if it is sufficient, otherwise no parallel processing is possible on the same symbol. In such an embodiment, sequential processing may be performed.

In one embodiment, a mechanism for the UE to provision UL resources for transmitting positioning measurement report(s) within a defined period to the LMF 144 is described. Currently NR defines two types of the configured grants, viz. Type 1 and Type 2 grants:

Type 1 grants can be configured via RRC including the periodicity

Type 2 grants can be activated/deactivated via DCI.

In the case of UE-assisted positioning, the measurement report may be transmitted via the ProvideLocation message (higher layer NAS signaling), which is inherently non-dynamic when compared to the Type 1 and Type 2 configured grants, which are based on L1/L2 signaling For UE-based positioning, the ProvideLocation message provides the computed location estimate of the UE.

Figure 9:
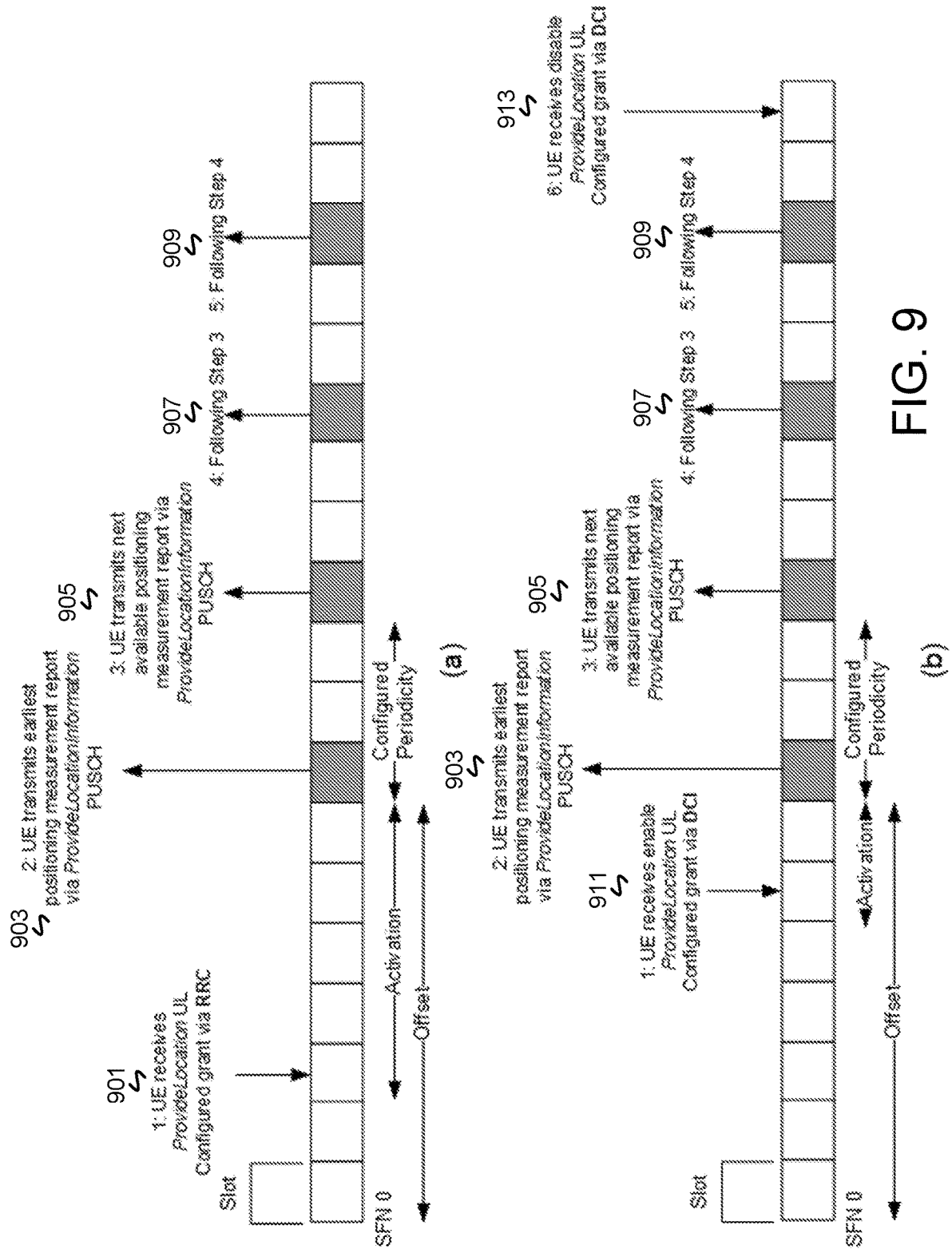
FIG. 9 is a diagram illustrating one embodiment of dynamic positioning measurement reporting based on UL CG for configuring, measuring, and processing positioning measurements and sending reports.

The LMF 144 may request the serving gNB to configure UL grants once the positioning-related measurements, e.g., based on prior DL-PRS transmissions, are ready to be reported (e.g., Step 4 of FIG. 6 or Step 6 of FIG. 7). FIG. 9 is an illustration of the dynamic reporting mechanism. In FIG. 9(a), Step (1) 901, the UE receives the UL CG configuration, containing exemplary configuration details such as the time-frequency resources, activation indication, offset, and/or periodicity. The serving gNB may have prior confirmation through message exchanges with the LMF 144 regarding the scheduling of the DL-PRS with other neighboring cells since a target-UE of a serving cell can only be configured with a UL Type 1 activation (FIG. 9(a)) or a Type 2 activation (FIG. 9(b)). Steps (2)-(5) 903-909 of FIG. 9(a) include the transmission of the positioning report based on earliest availability.

In an alternative implementation, the measurements may be ranked according to measurement priority or as per the positioning latency budget and transmitted accordingly. In FIG. 9(b), the UL CG may be deactivated, at Step (6) 913, using explicit signaling e.g., using the ProvideLocation message. In another implementation example, the ProvideLocation message may also contain another UL CG activation for the next UL configured grant for measurement reporting.

In another implementation, explicit indication of the deactivation of the UL CG with activation message (after a certain configured time) can be indicated in Step (1) 911, when the UE first receives the UL CG configuration.

In an alternate embodiment, when a UE is configured with a PRS measurement report that may contain multiple quantities to be reported for the corresponding positioning techniques, then partial reporting could be done (specially for low-latency requirements), where multiple UL resources are configured or indicated, and partial reporting is done on different instances of the UL resources. Basically, in one embodiment, for a partial report, instead of processing the entire report, the UE starts reporting the individual parts as they are ready. The exact sequence of partial reporting, e.g., which quantity is reported earlier than the other may be configured to the UE explicitly to implicitly based on the required processing timeline for each quantity.

In further embodiments, a method of prioritization of PRS measurement reports based on availability of UL resources is described. In the scenario where the is a limited availability of UL CG resources for transmitting all the readily available measurement reports, in certain embodiments, a prioritization criteria may be applied to each of the positioning measurements based on a certain criteria such as positioning latency budget, accuracy, and type of positioning method.

The prioritization criteria may be configured by the LMF 144 via e.g., a ProvideAssistanceData message in the case of UE-assisted positioning methods. In the case of UE-based positioning methods, the UE may indicate to the LMF 144 and/or gNB, the preferred criteria of the requested message via e.g., RequestAssistanceData message on the PUSCH. This enables efficient processing of the DL-PRS based on the associated priority criteria of each of the measurements.

In an alternative implementation, the target-UE may request the preferred priority of the positioning-related reference signal measurements, e.g., DL-PRS, SRS, in an on-demand manner using either L1, e.g., DCI, or L2 e.g., RRC/MAC CE signaling.

In one example, when the UE is required to process multiple PRS reports and each report is assigned or indicated with a priority level, then the UE starts with the highest priority report and calculates the available processing units and assigns the required processing units to $1^{st}$ report with highest priority. Then the UE checks the remaining processing units and the required processing units for a $2^{nd}$ report with second highest priority and if the remaining available units are sufficient, then the UE is capable of parallel processing the $2^{nd}$ report as well. The UE then continues this process until it runs out of sufficient processing units. In that case, the UE can either delay the processing of lower priority reports, if the latency requirement could still be met. Otherwise, the UE may drop the low priority reports that cannot be processed within the required latency constraint.

In another example, the UE is required to perform measurements from multiple TRPs and process corresponding reports. If the priority associated or the associated accuracy is lower compared to other configured reports, then depending upon the availability of processing units, the UE could process all the measurements from all the TRPs in parallel or in a sequential manner with some delay. However, if such delays exceed the required latency constraint, then the UE drops measurements (or measurement reports) from one or more TRPs and only reports partial measurements (or measurement reports) from a sub-set of TRPs.

There may be cases where incomplete measurements may arise during a positioning measurement window resulting in an incomplete report. In order to increase the signal efficiency of positioning reporting by a target-UE, in one embodiment, the target-UE may be configured to drop measurements based on certain criteria including:

If a measurement report size based on a positioning technique exceeds the UL transmissions resource availability.

If measurements are lower in priority with respect to other high priority measurements.

If measurements are incomplete or corrupted, e.g., due to failure events and thus the report is not deemed beneficial for processing by the location server (LMF).

If measurements are not deemed to be reliable and/or do not satisfy the integrity requirements such as:
        a. Target Integrity Risk ("TIR");
        b. Alert Limit ("AL");
        c. Time-to-Alert ("TTA");
        d. Protection Level ("PL").

The TIR may be further defined as the probability that the positioning error exceeds the AL without warning the user within the required TTA. The AL, as used herein, is defined as the maximum allowable positioning error such that the positioning system is available for the intended application. If the positioning error is beyond the AL, operations may be hazardous, and the positioning system should be declared unavailable for the intended application to prevent loss of integrity. The TTA, as used herein, is referred to as the maximum allowable elapsed time from when the positioning error exceeds the AL until the function providing position integrity annunciates a corresponding alert. The PL, as used herein, is a statistical upper-bound of the positioning error that ensures that the probability per unit of time of the true error being greater than the AL and the PL being less than or equal to the AL, for longer than the TTA, is less than the required TIR.

In one embodiment, the target-UE may explicitly indicate the dropped measurements or the LMF 144 may implicitly infer the dropped measurements based on the provided measurement configuration.

Figure 10:
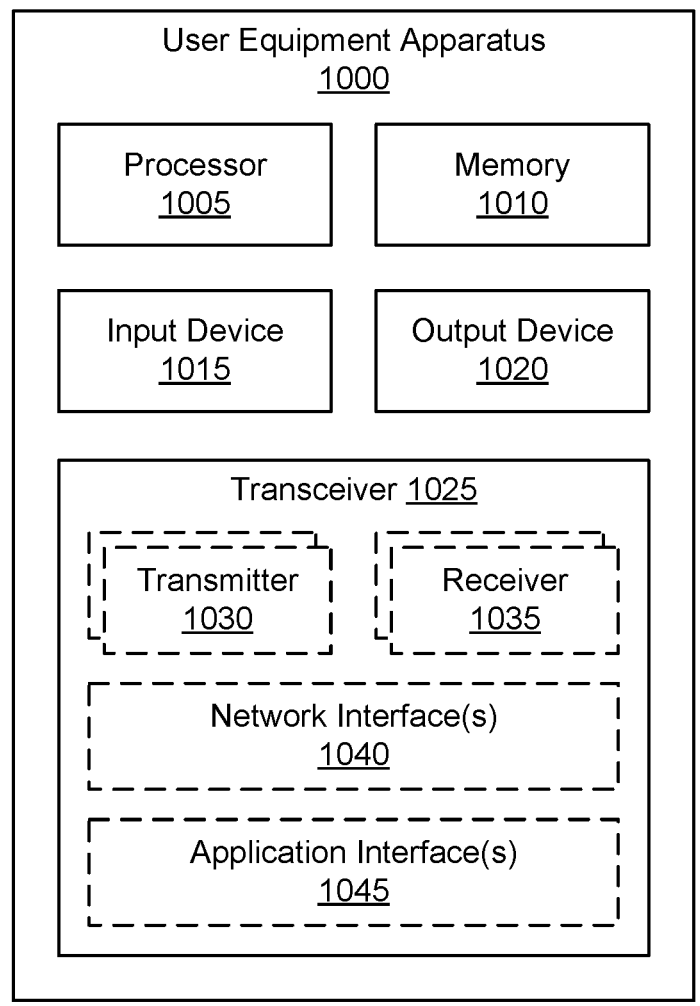
FIG. 10 is a block diagram illustrating one embodiment of a user equipment apparatus that may be used for configuring, measuring, and processing positioning measurements and sending reports.

FIG. 10 depicts a user equipment apparatus 1000 that may be used for configuring positioning measurements and reports, according to embodiments of the disclosure. In various embodiments, the user equipment apparatus 1000 is used to implement one or more of the solutions described above. The user equipment apparatus 1000 may be one embodiment of the remote unit 105 and/or the UE 205, described above. Furthermore, the user equipment apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the user equipment apparatus 1000 may not include any input device 1015 and/or output device 1020. In various embodiments, the user equipment apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. In some embodiments, the transceiver 1025 communicates with one or more cells (or wireless coverage areas) supported by one or more base units 121. In various embodiments, the transceiver 1025 is operable on unlicensed spectrum. Moreover, the transceiver 1025 may include multiple UE panels supporting one or more beams. Additionally, the transceiver 1025 may support at least one network interface 1040 and/or application interface 1045. The application interface(s) 1045 may support one or more APIs. The network interface(s) 1040 may support 3GPP reference points, such as Uu, N1, PC5, etc. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025.

In various embodiments, the processor 1005 controls the user equipment apparatus 1000 to implement the above described UE behaviors. In certain embodiments, the processor 1005 may include an application processor (also known as "main processor") which manages application-domain and operating system ("OS") functions and a baseband processor (also known as "baseband radio processor") which manages radio functions.

In one embodiment, the 1025 transceiver receives, from a mobile wireless communication network, a positioning configuration defining a positioning configuration timeline and a measurement and processing time window for the UE. The positioning configuration may include a timeline duration defining when to start performing measurements, a set of positioning measurements to be taken within the configured time window, and a window duration for measuring and processing requested position-relation measurements for the UE according to the positioning processing timeline.

In one embodiment, the processor 1005 performs at least one positioning measurement for the UE according to the positioning processing timeline in response to receiving the positioning configuration. In certain embodiments, the transceiver 1025 sends a positioning measurement report comprising the at least one positioning measurement and measurement timeline performed of the at least one positioning measurement within the configured time window from the UE to the mobile wireless communication network.

In one embodiment, multiple one of configuration timelines and measurement and processing timelines may be configured for the UE, and wherein a latency for at least one of a reference signal received power ("RSRP"), a reference signal time difference ("RSTD"), and a UE Rx-Tx positioning measurement within each of the multiple measurement and processing timelines may be reported to the mobile wireless communication network.

In one embodiment, the latency may comprise a single value in response to positioning measurements being performed at a same time and multiple values in response to positioning measurements being performed sequentially.

In one embodiment, the transceiver 1025 receives pre-configured assistance data for positioning from the mobile wireless communication network during a Long-term evolution Protocol Positioning ("LPP") session and performs measurements and processing on the pre-configured assistance data in response to the transceiver receiving an LPP Request Location Information message.

In one embodiment, the transceiver 1025 receives the positioning configuration from the mobile wireless communication network via a broadcast signal, the positioning configuration designed for a plurality of UEs with same capabilities.

In one embodiment, the transceiver 1025 receives the positioning configuration from the mobile wireless communication network via a UE-specific dedicated signal, the UE-specific dedicated signal comprising an LPP Request Location Information message.

In one embodiment, in response to the UE initiating a positioning reference signal ("PRS") configuration request, the processor 1005 determines an overall timeline between receiving the configuration request and receiving the UE's position estimate, the overall timeline comprising multiple timelines related to the configuration of assistance data, measurement, processing, and calculation of the UE's position estimate.

In one embodiment, the transceiver 1025 sends an on-demand request to the mobile wireless communication network to receive downlink-PRS ("DL-PRS") assistance data in response to at least one of no prior DL-PRS physical layer configuration stored at the UE, existing DL-PRS configuration is outdated, and the existing DL-PRS configuration does not meet accuracy requirements.

In one embodiment, the positioning configuration further comprises a set of measurement gap configurations to be applied by the UE for the positioning processing timeline, the measurement gap configuration defining a measurement gap length and a measurement gap length and a measurement gap repetition period for the positioning processing timeline.

In one embodiment, the set of measurement gap configurations can be pre-configured in the UE via signaling from the mobile wireless communication network. In one embodiment, the processor 1005 processes PRS measurements and reports according to a UE PRS processing unit ("PPU"), the UE PPU comprising a number of PPUs that the UE can support for a given symbol.

In one embodiment, based on the UE's capabilities, the processor 1005 performs parallel processing of the same PRS symbol with respect to other positioning measurements. In one embodiment, the mobile wireless communication network comprises at least one of a base station and a location management function.

In further embodiments, the transceiver 1025 receives, from a mobile wireless communication network, an uplink ("UL") configured grant configuration based on criteria associated with at least one of a measurement priority order, a positioning latency budget and a positioning processing timeline for the UE. In some embodiments, the processor 1005 performs at least one positioning measurement for the UE according to at least one of the measurement priority order and the positioning processing timeline and generates a positioning measurement report comprising the at least one positioning measurement.

In certain embodiments, the transceiver 1025 sends the positioning measurement report to the mobile wireless communication network using the UL configured grant configuration based on an availability of positioning-related reference signal measurements based on at least one of the measurement priority order and the positioning processing timeline.

In one embodiment, the UE is configured with a Type 1 UL configured grant configuration via radio resource control ("RRC") signaling for sending the positioning measurement report comprising the at least one positioning measurement.

In one embodiment, the UE is configured with a Type 2 UL configured grant configuration via downlink control information ("DCI") signaling for sending the positioning measurement report comprising the at least one positioning measurement.

In one embodiment, the UL configured grant configuration comprises signaling information for one or more of an offset, a periodicity, an activation, a deactivation, and time-frequency resources of the positioning measurement report comprising the at least one positioning measurement.

In one embodiment, the transceiver 1025 receives a positioning measurement configuration indicating a positioning measurement priority order based on the availability of positioning-related reference signal resources, the priority order determined based on at least one of the UE's capabilities, the positioning latency budget, and a location estimate accuracy. In one embodiment, the processor 1005 performs the at least one positioning measurement and generates the positioning measurement report according to the priority order indicated in the positioning measurement configuration. In one embodiment, the transceiver 1025 sends the positioning measurement report to the mobile wireless communication network using the UL configured grant configuration according to the priority order indicated in the measurement configuration.

In one embodiment, the transceiver 1025 receives the positioning measurement configuration in response to sending a request for the positioning measurement configuration. In one embodiment, the positioning measurement priority order is configured by at least one of a location server and a base station of the mobile wireless communication network. In one embodiment, the location server exchanges information with the base station related to the configuration and scheduling of the physical uplink shared channel ("PUSCH").

In one embodiment, the transceiver 1025 dynamically provides the positioning measurement configuration, on-demand, using at least one of radio resource control ("RRC") signaling and medium access control ("MAC") control element ("CE") signaling. In one embodiment, the processor 1005 drops the positioning-related reference signal measurements to be reported in response to at least one of a measurement report size exceeding UL transmission resource availability, measurements being lower in priority with respect to other measurements with higher priority, measurements being one of incomplete and corrupted, and measurements determined to be unreliable in response to not satisfying one or more integrity requirements.

In one embodiment, the processor 1005 drops the positioning-related reference signal measurements based on at least one of the latency budget and the measurement and processing timeline.

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data related to configuring positioning measurements and reports. For example, the memory 1010 may store various parameters, panel/beam configurations, resource assignments, policies, and the like as described above. In certain embodiments, the memory 1010 also stores program code and related data, such as an operating system or other controller algorithms operating on the apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 1020 may include a wearable display separate from, but communicatively coupled to, the rest of the user equipment apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all, or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 communicates with one or more network functions of a mobile communication network via one or more access networks. The transceiver 1025 operates under the control of the processor 1005 to transmit messages, data, and other signals and also to receive messages, data, and other signals. For example, the processor 1005 may selectively activate the transceiver 1025 (or portions thereof) at particular times in order to send and receive messages.

The transceiver 1025 includes at least transmitter 1030 and at least one receiver 1035. One or more transmitters 1030 may be used to provide UL communication signals to a base unit 121, such as the UL transmissions described herein. Similarly, one or more receivers 1035 may be used to receive DL communication signals from the base unit 121, as described herein.

Although only one transmitter 1030 and one receiver 1035 are illustrated, the user equipment apparatus 1000 may have any suitable number of transmitters 1030 and receivers 1035. Further, the transmitter(s) 1030 and the receiver(s) 1035 may be any suitable type of transmitters and receivers. In one embodiment, the transceiver 1025 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1025, transmitters 1030, and receivers 1035 may be implemented as physically separate components that access a shared hardware resource and/or software resource, such as for example, the network interface 1040.

In various embodiments, one or more transmitters 1030 and/or one or more receivers 1035 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 1030 and/or one or more receivers 1035 may be implemented and/or integrated into a multi-chip module. In some embodiments, other components such as the network interface 1040 or other hardware components/circuits may be integrated with any number of transmitters 1030 and/or receivers 1035 into a single chip. In such embodiment, the transmitters 1030 and receivers 1035 may be logically configured as a transceiver 1025 that uses one more common control signals or as modular transmitters 1030 and receivers 1035 implemented in the same hardware chip or in a multi-chip module.

Figure 11:
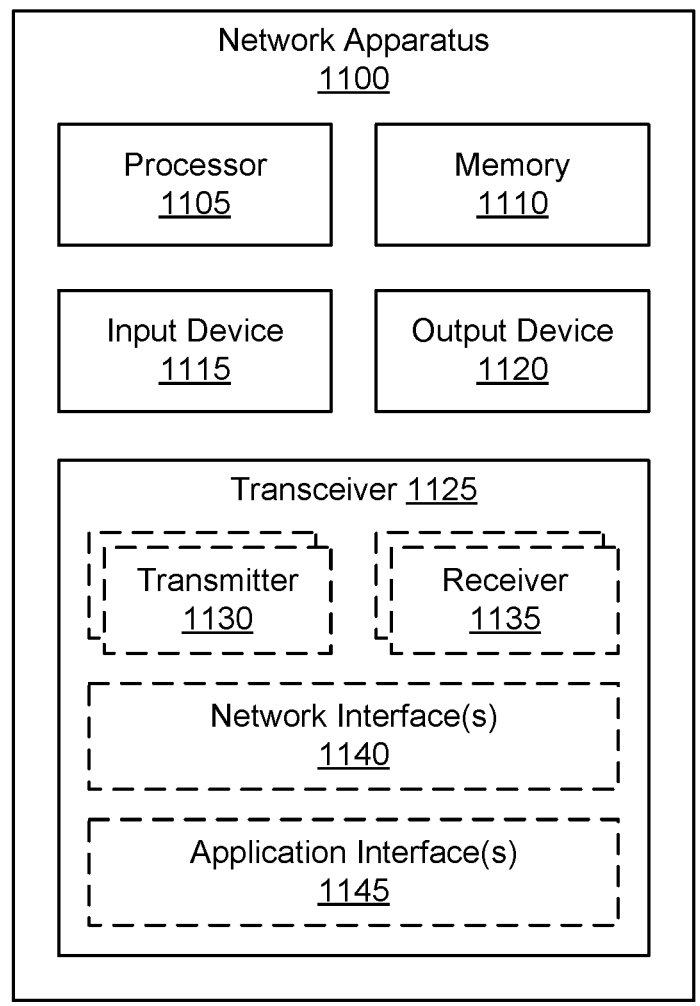
FIG. 11 is a block diagram illustrating one embodiment of a network equipment apparatus that may be used for configuring, measuring, and processing positioning measurements and sending reports.

FIG. 11 depicts a network apparatus 1100 that may be used for configuring positioning measurements and reports, according to embodiments of the disclosure. In one embodiment, network apparatus 1100 may be one implementation of a RAN node, such as the base unit 121 and/or the RAN node 210, as described above. Furthermore, the base network apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the network apparatus 1100 may not include any input device 1115 and/or output device 1120. In various embodiments, the network apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. Here, the transceiver 1125 communicates with one or more remote units 175. Additionally, the transceiver 1125 may support at least one network interface 1140 and/or application interface 1145. The application interface(s) 1145 may support one or more APIs. The network interface(s) 1140 may support 3GPP reference points, such as Uu, N1, N2 and N3. Other network interfaces 1140 may be supported, as understood by one of ordinary skill in the art.

The processor 1105, in one embodiment, may include any known controller capable of executing computer-readable instructions and/or capable of performing logical operations.

For example, the processor 1105 may be a microcontroller, a microprocessor, a CPU, a GPU, an auxiliary processing unit, a FPGA, or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125.

In various embodiments, the network apparatus 1100 is a RAN node (e.g., gNB) that communicates with one or more UEs, as described herein. In such embodiments, the processor 1105 controls the network apparatus 1100 to perform the above described RAN behaviors. When operating as a RAN node, the processor 1105 may include an application processor (also known as "main processor") which manages application-domain and operating system ("OS") functions and a baseband processor (also known as "baseband radio processor") which manages radio functions.

In various embodiments, the processor 1105 and transceiver 1125 control the network apparatus 1100 to perform the above described LMF behaviors. For example, in one embodiment, the transceiver 1125 sends, to a User Equipment ("UE") device, a positioning configuration defining a positioning configuration timeline and a measurement and processing time window for the UE. In one embodiment, the positioning configuration comprising a timeline duration defining when to start performing measurements, a set of positioning measurements to be taken within the configured time window, and a window duration for measuring and processing requested position-relation measurements for the UE according to the positioning processing timeline.

In one embodiment, the transceiver 11215 receives, from the UE device, a positioning measurement report comprising the at least one positioning measurement and measurement timeline of the at least one positioning measurement performed within the configured time window. In one embodiment, the positioning configuration timeline is determined as a function of different individual timelines associated with configuration of assistance data, measurements, processing, and calculation of the UE's position estimate.

In one embodiment, the transceiver 1125 sends, to a User Equipment ("UE") device, an uplink ("UL") configured grant configuration based on criteria associated with at least one of a measurement priority order, a positioning latency budget, and a positioning processing timeline for the UE and receives a positioning measurement report from the UE using the UL configured grant configuration based on an availability of positioning-related reference signal measurements based on at least one of the measurement priority order and the positioning processing timeline.

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to configuring positioning measurements and reports. For example, the memory 1110 may store parameters, configurations, resource assignments, policies, and the like, as described above. In certain embodiments, the memory 1110 also stores program code and related data, such as an operating system or other controller algorithms operating on the apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, an LCD display, an LED display, an OLED display, a projector, or similar display device capable of outputting images, text, or the like to a user. As another, non-limiting, example, the output device 1120 may include a wearable display separate from, but communicatively coupled to, the rest of the network apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all, or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 includes at least transmitter 1130 and at least one receiver 1135. One or more transmitters 1130 may be used to communicate with the UE, as described herein. Similarly, one or more receivers 1135 may be used to communicate with network functions in the PLMN and/or RAN, as described herein. Although only one transmitter 1130 and one receiver 1135 are illustrated, the network apparatus 1100 may have any suitable number of transmitters 1130 and receivers 1135. Further, the transmitter(s) 1130 and the receiver(s) 1135 may be any suitable type of transmitters and receivers.

Figure 12:
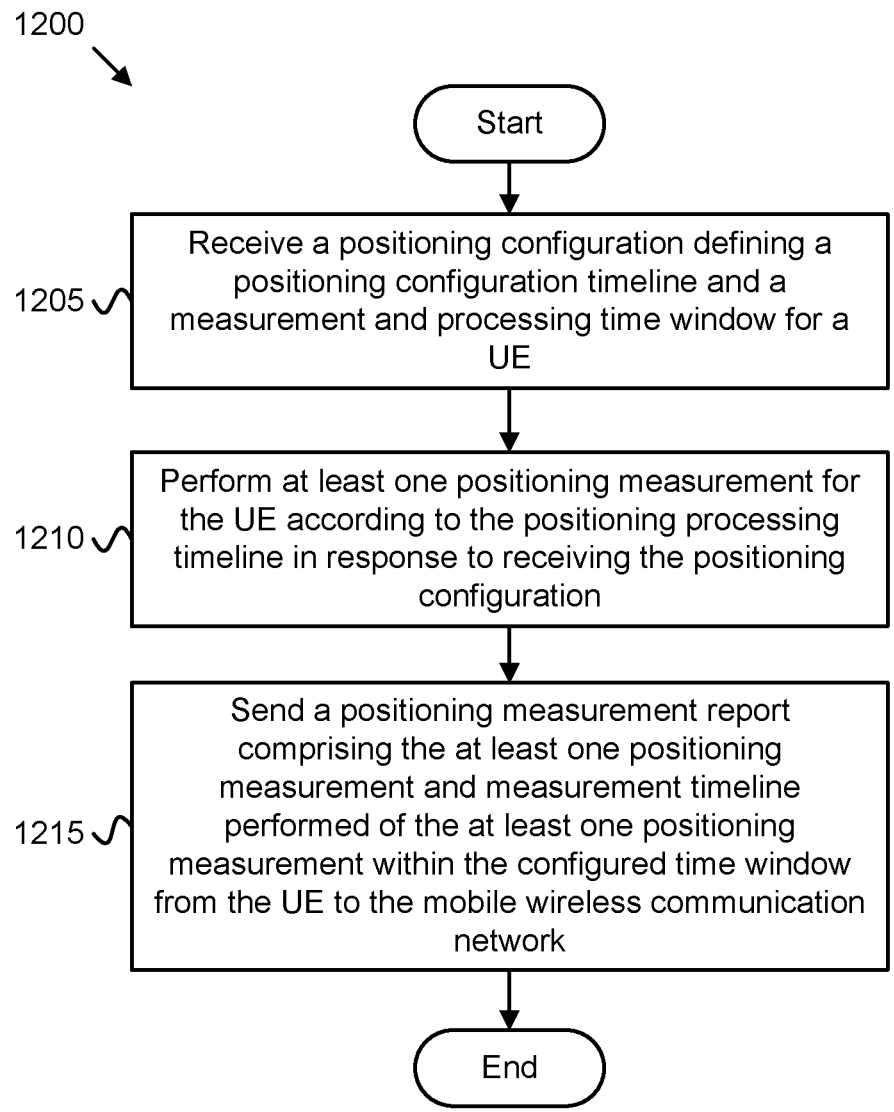
FIG. 12 is a block diagram illustrating one embodiment of a first method for configuring, measuring, and processing positioning measurements and sending reports.

FIG. 12 depicts one embodiment of a method 1200 for configuring positioning measurements and reports, according to embodiments of the disclosure. In various embodiments, the method 1200 is performed by a user equipment device in a mobile communication network, such as the remote unit 105, the UE 205, and/or the user equipment apparatus 1000, described above. In some embodiments, the method 1200 is performed by a processor, such as a microcontroller, a microprocessor, a CPU, a GPU, an auxiliary processing unit, a FPGA, or the like.

In one embodiment, the method 1200 begins and receives 1205, from a mobile wireless communication network, a positioning configuration defining a positioning configuration timeline and a measurement and processing time window for the UE. The method 1200, in some embodiments, includes performing 1210 at least one positioning measurement for the UE according to the positioning processing timeline in response to receiving the positioning configuration. The method 1200, in further embodiments, includes sending 1215 a positioning measurement report comprising the at least one positioning measurement and measurement timeline performed of the at least one positioning measurement within the configured time window from the UE to the mobile wireless communication network, and the method 1200 ends.

Figure 13:
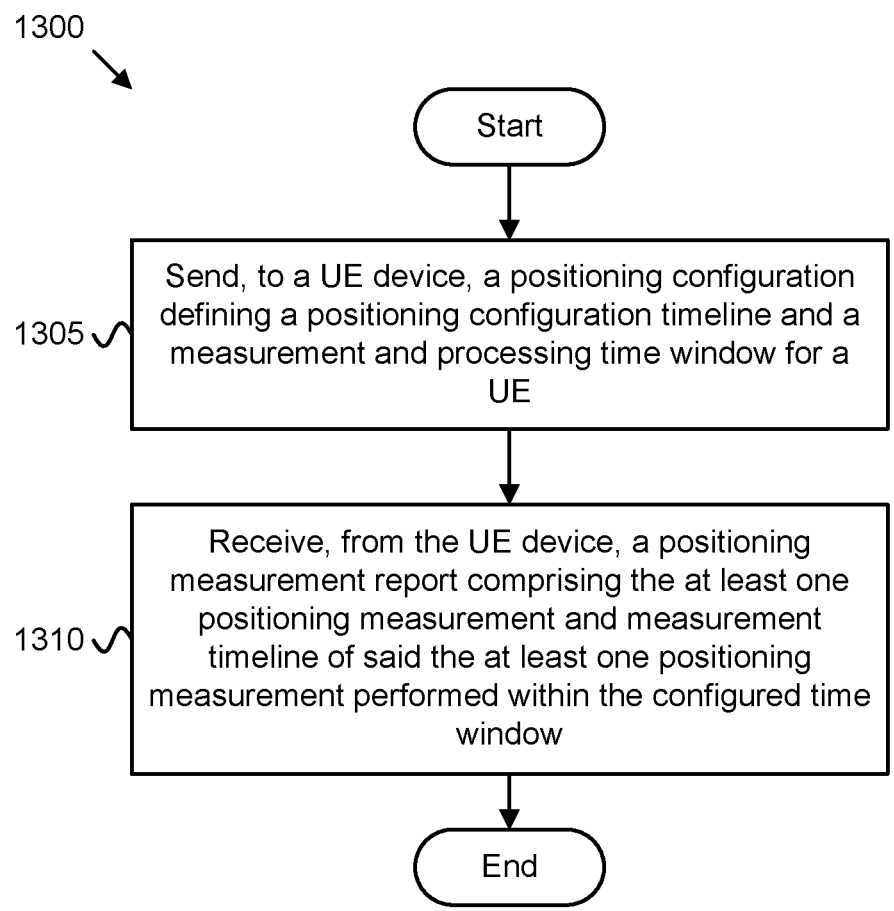
FIG. 13 is a block diagram illustrating one embodiment of a second method for configuring, measuring, and processing positioning measurements and sending reports.

FIG. 13 depicts one embodiment of a method 1300 for configuring positioning measurements and reports, according to embodiments of the disclosure. In various embodiments, the method 1300 is performed by a Location Management Function in a mobile communication network, such as the LMF 144, and/or the network apparatus 1100, described above. In some embodiments, the method 1300 is performed by a processor, such as a microcontroller, a microprocessor, a CPU, a GPU, an auxiliary processing unit, a FPGA, or the like.

The method 1300 begins and sends 1305, in one embodiment, to a UE, a positioning configuration defining a positioning configuration timeline and a measurement and processing time window for the UE. The method 1300, in one embodiment, includes receiving 1310, from the UE device, a positioning measurement report comprising the at least one positioning measurement and measurement timeline of the at least one positioning measurement performed within the configured time window, and the method 1300 ends.

Figure 14:
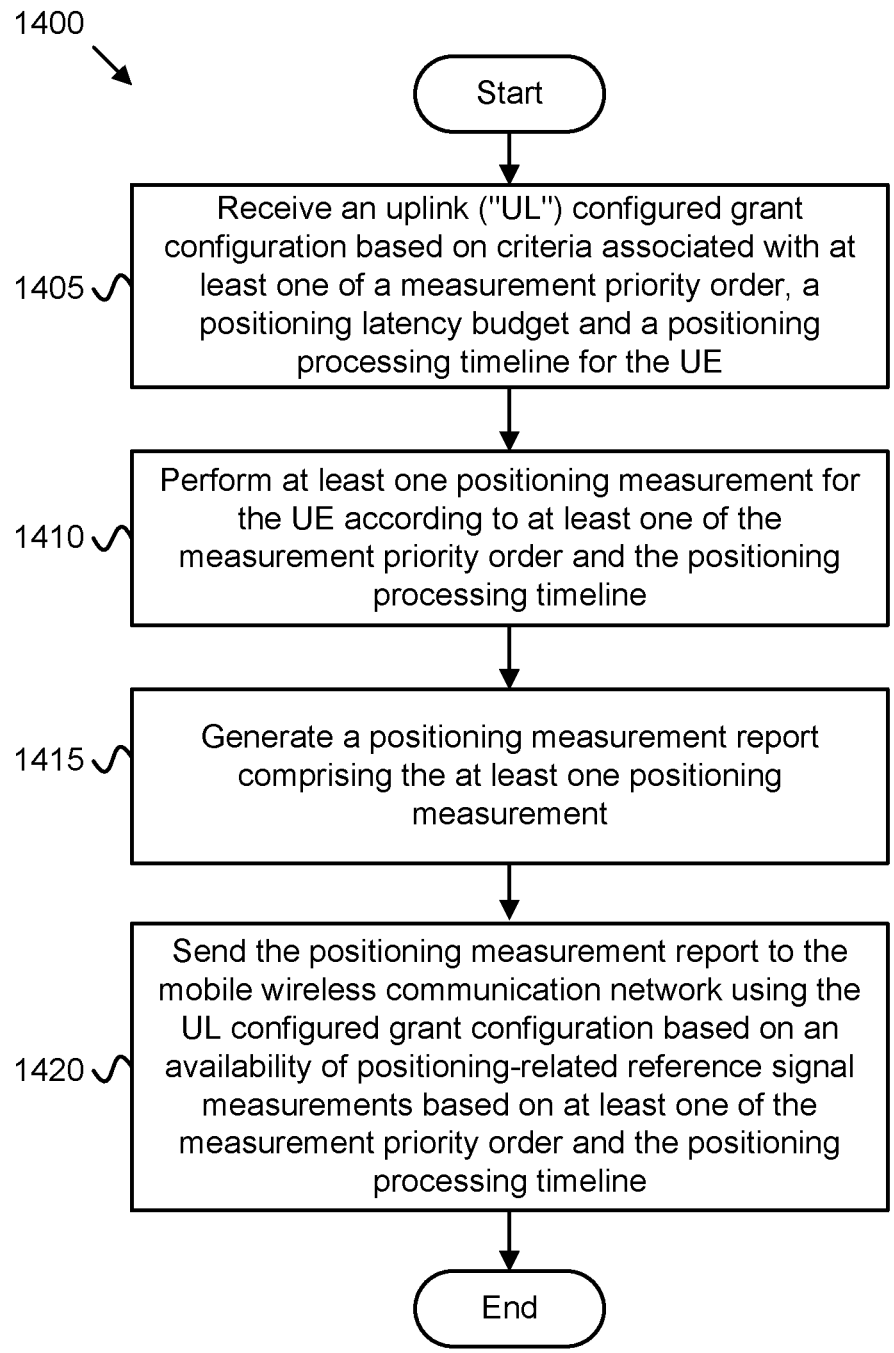
FIG. 14 is a block diagram illustrating one embodiment of a third method for configuring, measuring, and processing positioning measurements and sending reports.

FIG. 14 depicts one embodiment of a method 1400 for configuring positioning measurements and reports, according to embodiments of the disclosure. In various embodiments, the method 1400 is performed by a user equipment device in a mobile communication network, such as the remote unit 105, the UE 205, and/or the user equipment apparatus 1000, described above. In some embodiments, the method 1400 is performed by a processor, such as a microcontroller, a microprocessor, a CPU, a GPU, an auxiliary processing unit, a FPGA, or the like.

In one embodiment, the method 1400 begins and receives 1405, from a mobile wireless communication network, an uplink ("UL") configured grant configuration based on criteria associated with at least one of a measurement priority order, a positioning latency budget, and a positioning processing timeline for the UE. In one embodiment, the method 1400 performs 1410 at least one positioning measurement for the UE according to at least one of the measurement priority order and the positioning processing timeline and generates 1415 a positioning measurement report comprising the at least one positioning measurement.

In certain embodiments, the method 1400 sends 1420 the positioning measurement report to the mobile wireless communication network using the UL configured grant configuration based on an availability of positioning-related reference signal measurements based on at least one of the measurement priority order and the positioning processing timeline, and the method 1400 ends.

Figure 15:
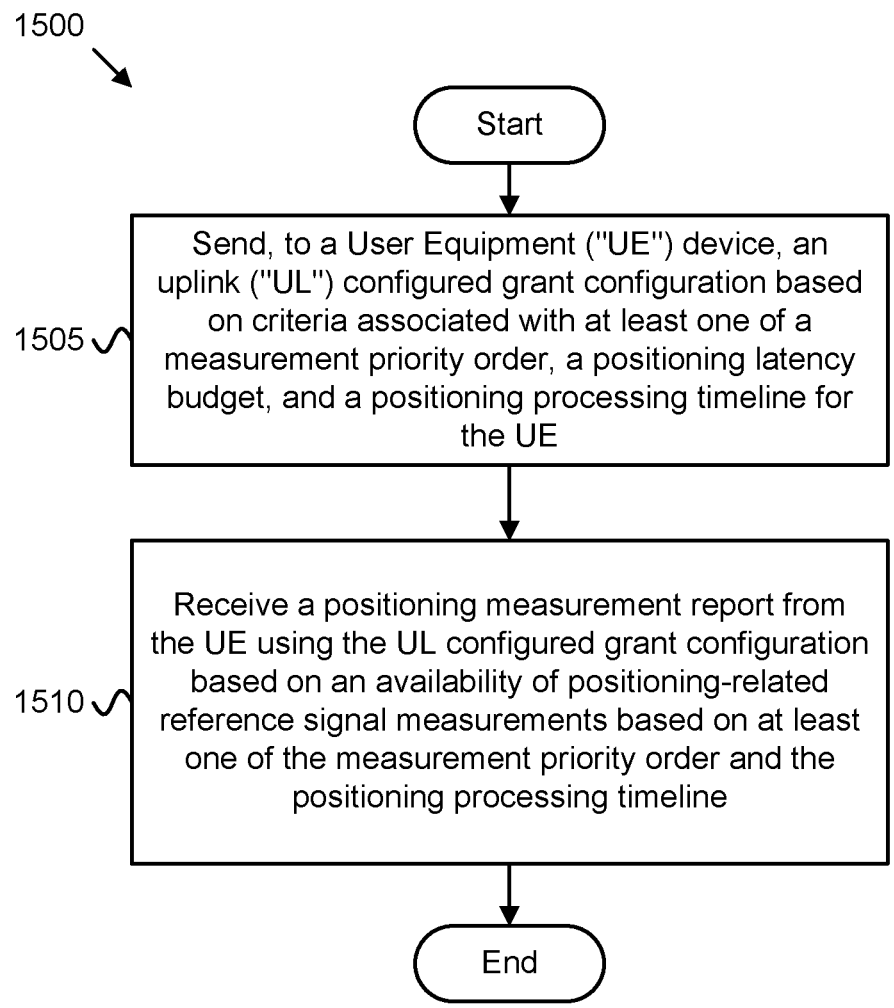
FIG. 15 is a block diagram illustrating one embodiment of a fourth method for configuring, measuring, and processing positioning measurements and sending reports.

FIG. 15 depicts one embodiment of a method 1300 for configuring positioning measurements and reports, according to embodiments of the disclosure. In various embodiments, the method 1300 is performed by a Location Management Function in a mobile communication network, such as the LMF 144, and/or the network apparatus 1100, described above. In some embodiments, the method 1300 is performed by a processor, such as a microcontroller, a microprocessor, a CPU, a GPU, an auxiliary processing unit, a FPGA, or the like.

In one embodiment, the method 1500 begins and sends 1505, to a User Equipment ("UE") device, an uplink ("UL") configured grant configuration based on criteria associated with at least one of a measurement priority order, a positioning latency budget, and a positioning processing timeline for the UE. In further embodiments, the method 1500 receives 1510 a positioning measurement report from the UE device using the UL configured grant configuration based on an availability of positioning-related reference signal measurements based on at least one of the measurement priority order and the positioning processing timeline, and the method 1500 ends.

Disclosed herein is a first apparatus for configuring positioning measurements and reports, according to embodiments of the disclosure. The first apparatus may be implemented by a user equipment device in a mobile communication network, such as the remote unit 105, the UE 205, and/or the user equipment apparatus 1000, described above.

In one embodiment, the first apparatus includes a transceiver that receives, from a mobile wireless communication network, a positioning configuration defining a positioning configuration timeline and a measurement and processing time window for the UE. The positioning configuration may include a timeline duration defining when to start performing measurements, a set of positioning measurements to be taken within the configured time window, and a window duration for measuring and processing requested position-relation measurements for the UE according to the positioning processing timeline.

In one embodiment, the first apparatus includes a processor that performs at least one positioning measurement for the UE according to the positioning processing timeline in response to receiving the positioning configuration. In certain embodiments, the transceiver sends a positioning measurement report comprising the at least one positioning measurement and measurement timeline performed of the at least one positioning measurement within the configured time window from the UE to the mobile wireless communication network.

In one embodiment, multiple one of configuration timelines and measurement and processing timelines may be configured for the UE, and wherein a latency for at least one of a reference signal received power ("RSRP"), a reference signal time difference ("RSTD"), and a UE Rx-Tx positioning measurement within each of the multiple measurement and processing timelines may be reported to the mobile wireless communication network.

In one embodiment, the latency may comprise a single value in response to positioning measurements being performed at a same time and multiple values in response to positioning measurements being performed sequentially.

In one embodiment, the transceiver receives pre-configured assistance data for positioning from the mobile wireless communication network during a Long-term evolution Protocol Positioning ("LPP") session and performs measurements and processing on the pre-configured assistance data in response to the transceiver receiving an LPP Request Location Information message.

In one embodiment, the transceiver receives the positioning configuration from the mobile wireless communication network via a broadcast signal, the positioning configuration designed for a plurality of UEs with same capabilities.

In one embodiment, the transceiver receives the positioning configuration from the mobile wireless communication network via a UE-specific dedicated signal, the UE-specific dedicated signal comprising an LPP Request Location Information message.

In one embodiment, in response to the UE initiating a positioning reference signal ("PRS") configuration request, the processor determines an overall timeline between receiving the configuration request and receiving the UE's position estimate, the overall timeline comprising multiple timelines related to the configuration of assistance data, measurement, processing, and calculation of the UE's position estimate.

In one embodiment, the transceiver sends an on-demand request to the mobile wireless communication network to receive downlink-PRS ("DL-PRS") assistance data in response to at least one of no prior DL-PRS physical layer configuration stored at the UE, existing DL-PRS configuration is outdated, and the existing DL-PRS configuration does not meet accuracy requirements.

In one embodiment, the positioning configuration further comprises a set of measurement gap configurations to be applied by the UE for the positioning processing timeline, the measurement gap configuration defining a measurement gap length and a measurement gap length and a measurement gap repetition period for the positioning processing timeline.

In one embodiment, the set of measurement gap configurations can be pre-configured in the UE via signaling from the mobile wireless communication network. In one embodiment, the processor processes PRS measurements and reports according to a UE PRS processing unit ("PPU"), the UE PPU comprising a number of PPUs that the UE can support for a given symbol.

In one embodiment, based on the UE's capabilities, the processor performs parallel processing of the same PRS symbol with respect to other positioning measurements. In one embodiment, the mobile wireless communication network comprises at least one of a base station and a location management function.

Disclosed herein is a first method for configuring positioning measurements and reports, according to embodiments of the disclosure. The first method may be performed by a user equipment device in a mobile communication network, such as the remote unit 105, the UE 205, and/or the user equipment apparatus 1000, described above.

In one embodiment, the first method includes receiving, from a mobile wireless communication network, a positioning configuration defining a positioning configuration timeline and a measurement and processing time window for the UE. The positioning configuration may include a timeline duration defining when to start performing measurements, a set of positioning measurements to be taken within the configured time window, and a window duration for measuring and processing requested position-relation measurements for the UE according to the positioning processing timeline.

In one embodiment, the first method includes performing at least one positioning measurement for the UE according to the positioning processing timeline in response to receiving the positioning configuration. In certain embodiments, the first method includes sending a positioning measurement report comprising the at least one positioning measurement and measurement timeline performed of the at least one positioning measurement within the configured time window from the UE to the mobile wireless communication network.

In one embodiment, multiple one of configuration timelines and measurement and processing timelines may be configured for the UE, and wherein a latency for at least one of a reference signal received power ("RSRP"), a reference signal time difference ("RSTD"), and a UE Rx-Tx positioning measurement within each of the multiple measurement and processing timelines may be reported to the mobile wireless communication network.

In one embodiment, the latency may comprise a single value in response to positioning measurements being performed at a same time and multiple values in response to positioning measurements being performed sequentially.

In one embodiment, the first method includes receiving pre-configured assistance data for positioning from the mobile wireless communication network during a Long-term evolution Protocol Positioning ("LPP") session and performs measurements and processing on the pre-configured assistance data in response to the transceiver receiving an LPP Request Location Information message.

In one embodiment, the first method includes receiving the positioning configuration from the mobile wireless communication network via a broadcast signal, the positioning configuration designed for a plurality of UEs with same capabilities.

In one embodiment, the first method includes receiving the positioning configuration from the mobile wireless communication network via a UE-specific dedicated signal, the UE-specific dedicated signal comprising an LPP Request Location Information message.

In one embodiment, in response to the UE initiating a positioning reference signal ("PRS") configuration request, the method includes determining an overall timeline between receiving the configuration request and receiving the UE's position estimate, the overall timeline comprising multiple timelines related to the configuration of assistance data, measurement, processing, and calculation of the UE's position estimate.

In one embodiment, the first method includes sending an on-demand request to the mobile wireless communication network to receive downlink-PRS ("DL-PRS") assistance data in response to at least one of no prior DL-PRS physical layer configuration stored at the UE, existing DL-PRS configuration is outdated, and the existing DL-PRS configuration does not meet accuracy requirements.

In one embodiment, the positioning configuration further comprises a set of measurement gap configurations to be applied by the UE for the positioning processing timeline, the measurement gap configuration defining a measurement gap length and a measurement gap length and a measurement gap repetition period for the positioning processing timeline.

In one embodiment, the set of measurement gap configurations can be pre-configured in the UE via signaling from the mobile wireless communication network. In one embodiment, the first method includes processing PRS measurements and reports according to a UE PRS processing unit ("PPU"), the UE PPU comprising a number of PPUs that the UE can support for a given symbol.

In one embodiment, based on the UE's capabilities, the first method includes performing parallel processing of the same PRS symbol with respect to other positioning measurements. In one embodiment, the mobile wireless communication network comprises at least one of a base station and a location management function.

Disclosed herein is a second apparatus for configuring positioning measurements and reports, according to embodiments of the disclosure. The second apparatus may be implemented by a base station, e.g., a gNB, a location management function in a mobile communication network, such as the LMF 144, and/or the network apparatus 1100, described above.

In one embodiment, the second apparatus includes a transceiver that sends, to a User Equipment ("UE") device, a positioning configuration defining a positioning configuration timeline and a measurement and processing time window for the UE. In one embodiment, the positioning configuration comprising a timeline duration defining when to start performing measurements, a set of positioning measurements to be taken within the configured time window, and a window duration for measuring and processing requested position-relation measurements for the UE according to the positioning processing timeline.

In one embodiment, the transceiver receives, from the UE device, a positioning measurement report comprising the at least one positioning measurement and measurement timeline of the at least one positioning measurement performed within the configured time window. In one embodiment, the positioning configuration timeline is determined as a function of different individual timelines associated with configuration of assistance data, measurements, processing, and calculation of the UE's position estimate.

Disclosed herein is a second method for configuring positioning measurements and reports, according to embodiments of the disclosure. The second method may be performed by a base station, e.g., a gNB, a location management function device in a mobile communication network, such as the LMF 144, and/or the network apparatus 1700, described above.

In one embodiment, the second method includes sending, to a User Equipment ("UE") device, a positioning configuration defining a positioning configuration timeline and a measurement and processing time window for the UE. In one embodiment, the positioning configuration comprising a timeline duration defining when to start performing measurements, a set of positioning measurements to be taken within the configured time window, and a window duration for measuring and processing requested position-relation measurements for the UE according to the positioning processing timeline.

In one embodiment, the second method includes receiving, from the UE device, a positioning measurement report comprising the at least one positioning measurement and measurement timeline of the at least one positioning measurement performed within the configured time window. In one embodiment, the positioning configuration timeline is determined as a function of different individual timelines associated with configuration of assistance data, measurements, processing, and calculation of the UE's position estimate.

Disclosed herein is a third apparatus for configuring positioning measurements and reports, according to embodiments of the disclosure. The third apparatus may be implemented by a user equipment device in a mobile communication network, such as the remote unit 105, the UE 205, and/or the user equipment apparatus 1600, described above.

In one embodiment, the third apparatus includes a transceiver that receives, from a mobile wireless communication network, an uplink ("UL") configured grant configuration based on criteria associated with at least one of a measurement priority order, a positioning latency budget, and a positioning processing timeline for the UE. In some embodiments, the third apparatus includes a processor that performs at least one positioning measurement for the UE according to at least one of the measurement priority order and the positioning processing timeline and generates a positioning measurement report comprising the at least one positioning measurement.

In certain embodiments, the transceiver sends the positioning measurement report to the mobile wireless communication network using the UL configured grant configuration based on an availability of positioning-related reference signal measurements based on at least one of the measurement priority order and the positioning processing timeline.

In one embodiment, the UE is configured with a Type 1 UL configured grant configuration via radio resource control ("RRC") signaling for sending the positioning measurement report comprising the at least one positioning measurement.

In one embodiment, the UE is configured with a Type 2 UL configured grant configuration via downlink control information ("DCI") signaling for sending the positioning measurement report comprising the at least one positioning measurement.

In one embodiment, the UL configured grant configuration comprises signaling information for one or more of an offset, a periodicity, an activation, a deactivation, and time-frequency resources of the positioning measurement report comprising the at least one positioning measurement.

In one embodiment, the transceiver receives a positioning measurement configuration indicating the positioning measurement priority order based on the availability of positioning-related reference signal resources, the priority order determined based on at least one of the UE's capabilities, the positioning latency budget, and a location estimate accuracy. In one embodiment, the processor performs the at least one positioning measurement and generates the positioning measurement report according to the priority order indicated in the positioning measurement configuration. In one embodiment, the transceiver sends the positioning measurement report to the mobile wireless communication network using the UL configured grant configuration according to the priority order indicated in the measurement configuration.

In one embodiment, the transceiver receives the positioning measurement configuration in response to sending a request for the positioning measurement configuration. In one embodiment, the positioning measurement priority order is configured by at least one of a location server and a base station of the mobile wireless communication network. In one embodiment, the location server exchanges information with the base station related to the configuration and scheduling of the physical uplink shared channel ("PUSCH").

In one embodiment, the transceiver dynamically provides the positioning measurement configuration, on-demand, using at least one of radio resource control ("RRC") signaling and medium access control ("MAC") control element ("CE") signaling. In one embodiment, the processor drops the positioning-related reference signal measurements to be reported in response to at least one of a measurement report size exceeding UL transmission resource availability, measurements being lower in priority with respect to other measurements with higher priority, measurements being one of incomplete and corrupted, and measurements determined to be unreliable in response to not satisfying one or more integrity requirements.

In one embodiment, the processor drops the positioning-related reference signal measurements based on at least one of the latency budget and the measurement and processing timeline.

Disclosed herein is a third method for configuring positioning measurements and reports, according to embodiments of the disclosure. The third method may be performed by a user equipment device in a mobile communication network, such as the remote unit 105, the UE 205, and/or the user equipment apparatus 1600, described above.

In one embodiment, the third method includes receiving, from a mobile wireless communication network, an uplink ("UL") configured grant configuration based on criteria associated with at least one of a measurement priority order, a positioning latency budget, and a positioning processing timeline for the UE. In some embodiments, the third method includes performing at least one positioning measurement for the UE according to at least one of the measurement priority order and the positioning processing timeline and generating a positioning measurement report comprising the at least one positioning measurement.

In certain embodiments, the third method includes sending the positioning measurement report to the mobile wireless communication network using the UL configured grant configuration based on an availability of positioning-related reference signal measurements based on at least one of the measurement priority order and the positioning processing timeline.

In one embodiment, the third method includes configuring the UE with a Type 1 UL configured grant configuration via radio resource control ("RRC") signaling for sending the positioning measurement report comprising the at least one positioning measurement.

In one embodiment, the third method includes configuring the UE with a Type 2 UL configured grant configuration via downlink control information ("DCI") signaling for sending the positioning measurement report comprising the at least one positioning measurement.

In one embodiment, the UL configured grant configuration comprises signaling information for one or more of an offset, a periodicity, an activation, a deactivation, and time-frequency resources of the positioning measurement report comprising the at least one positioning measurement.

In one embodiment, the third method includes receiving a positioning measurement configuration indicating a positioning measurement priority order based on the availability of positioning-related reference signal resources, the priority order determined based on at least one of the UE's capabilities, the positioning latency budget, and a location estimate accuracy. In one embodiment, the third method includes performing the at least one positioning measurement and generates the positioning measurement report according to the priority order indicated in the positioning measurement configuration. In one embodiment, the third method includes sending the positioning measurement report to the mobile wireless communication network using the UL configured grant configuration according to the priority order indicated in the measurement configuration.

In one embodiment, the third method includes receiving the positioning measurement configuration in response to sending a request for the positioning measurement configuration. In one embodiment, the positioning measurement priority order is configured by at least one of a location server and a base station of the mobile wireless communication network. In one embodiment, the location server exchanges information with the base station related to the configuration and scheduling of the physical uplink shared channel ("PUSCH").

In one embodiment, the third method includes dynamically providing the positioning measurement configuration, on-demand, using at least one of radio resource control ("RRC") signaling and medium access control ("MAC") control element ("CE") signaling. In one embodiment, the third method includes dropping the positioning-related reference signal measurements to be reported in response to at least one of a measurement report size exceeding UL transmission resource availability, measurements being lower in priority with respect to other measurements with higher priority, measurements being one of incomplete and corrupted, and measurements determined to be unreliable in response to not satisfying one or more integrity requirements.

In one embodiment, the third method includes dropping the positioning-related reference signal measurements based on at least one of the latency budget and the measurement and processing timeline.

Disclosed herein is a fourth apparatus for configuring positioning measurements and reports, according to embodiments of the disclosure. The fourth apparatus may be implemented by a location management function in a mobile communication network, such as the LMF 144 and/or the network apparatus 1100, described above.

In one embodiment, the fourth apparatus includes a transceiver that sends, to a User Equipment ("UE") device, an uplink ("UL") configured grant configuration based on criteria associated with at least one of a measurement priority order, a positioning latency budget, and a positioning processing timeline for the UE and receives a positioning measurement report from the UE device using the UL configured grant configuration based on an availability of positioning-related reference signal measurements based on at least one of the measurement priority order and the positioning processing timeline.

Disclosed herein is a fourth method for configuring positioning measurements and reports, according to embodiments of the disclosure. The fourth method may be performed by a location management function device in a mobile communication network, such as the LMF 144 and/or the network apparatus 1100, described above.

In one embodiment, the fourth method includes sending, to a User Equipment ("UE") device, an uplink ("UL") configured grant configuration based on criteria associated with at least one of a measurement priority order, a positioning latency budget, and a positioning processing timeline for the UE and receiving a positioning measurement report from the UE device using the UL configured grant configuration based on an availability of positioning-related reference signal measurements based on at least one of the measurement priority order and the positioning processing timeline.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A apparatus, comprising:
   a processor; and
   a memory coupled with the processor, the memory comprising instructions executable by the processor to cause the apparatus to:
      receive, from a mobile wireless communication network, a positioning configuration defining a positioning configuration timeline and a measurement and processing time window for a user equipment ("UE"), the positioning configuration comprising a timeline duration defining when to start performing measurements, a set of positioning measurements to be taken within the configured time window, and a window duration for measuring and processing requested position-relation measurements for the UE according to the positioning processing timeline;

perform at least one positioning measurement for the UE according to the positioning processing timeline in response to receiving the positioning configuration; and send a positioning measurement report comprising the at least one positioning measurement and measurement timeline performed of the at least one positioning measurement within the configured time window from the UE to the mobile wireless communication network.

2. The apparatus of claim 1, wherein multiple one of configuration timelines and measurement and processing timelines may be configured for the UE, and wherein at least one of a reference signal received power ("RSRP"), a reference signal time difference ("RSTD"), and a UE Rx-Tx positioning measurement within each of the multiple measurement and processing timelines may be performed and reported to the mobile wireless communication network.

3. The apparatus of claim 2, wherein a positioning reference signal ("PRS") measurement and processing timeline duration for the UE may comprise:
 a single value in response to positioning measurements being performed at a same time; and
 multiple values in response to positioning measurements being performed sequentially.

4. The apparatus of claim 1, wherein the instructions are further executable by the processor to cause the apparatus to receive pre-configured assistance data for positioning from the mobile wireless communication network during a Long-term evolution Protocol Positioning ("LPP") session and perform measurements and processing on the pre-configured assistance data in response to the transceiver receiving an LPP Request Location Information message.

5. The apparatus of claim 1, wherein the instructions are further executable by the processor to cause the apparatus to receive the positioning configuration from the mobile wireless communication network via a broadcast signal, the positioning configuration designed for a plurality of UEs with same capabilities.

6. The apparatus of claim 1, wherein the instructions are further executable by the processor to cause the apparatus to receive the positioning configuration from the mobile wireless communication network via a UE-specific dedicated signal, the UE-specific dedicated signal comprising a medium access control ("MAC") control element ("CE") or radio resource control ("RRC") signaling message.

7. The apparatus of claim 1, wherein the instructions are further executable by the processor to cause the apparatus to the transceiver send an on-demand request to the mobile wireless communication network to receive downlink positioning reference signal ("DL-PRS") assistance data in response to at least one of:
 no prior DL-PRS physical layer configuration stored at the UE;
 existing DL-PRS configuration is outdated; and
 the existing DL-PRS configuration does not meet accuracy requirements.

8. The apparatus of claim 1, wherein the positioning configuration further comprises a set of measurement gap configurations to be applied by the UE for the positioning processing timeline, the measurement gap configuration defining a measurement gap length and a measurement gap length and a measurement gap repetition period for the positioning processing timeline.

9. The apparatus of claim 8, wherein the set of measurement gap configurations can be pre-configured in the UE via signaling from the mobile wireless communication network.

10. The apparatus of claim 1, wherein the instructions are further executable by the processor to cause the apparatus to process positioning-related measurements based on different positioning timeline configurations associated with different UE capabilities.

11. The apparatus of claim 10, wherein, based on the UE's capabilities, the instructions are further executable by the processor to cause the apparatus to process N downlink ("DL") positioning reference signal ("PRS") symbols every T ms for a given maximum bandwidth supported by the UE according to the positioning timeline configuration within an active DL bandwidth part ("BWP") configuration.

12. The apparatus of claim 1, wherein the mobile wireless communication network comprises a base station or a location management function.

13. A method, comprising:
 receiving, from a mobile wireless communication network, a positioning configuration defining a positioning configuration timeline and a, measurement and processing time window for a user equipment ("UE"), the positioning configuration comprising a timeline duration defining when to start performing measurements, a set of positioning measurements to be made taken within the configured time window, and a window duration for measuring and processing requested position-relation measurements for the UE according to the positioning processing timeline;
 performing at least one positioning measurement for the UE according to the positioning processing timeline in response to receiving the positioning configuration; and
 sending a positioning measurement report comprising the at least one positioning measurement and measurement timeline performed of the at least one positioning measurement within the configured time window from the UE to the mobile wireless communication network.

14. The method of claim 13, wherein multiple one of configuration timelines and measurement and processing timelines may be configured for the UE, and wherein at least one of a reference signal received power ("RSRP"), a reference signal time difference ("RSTD"), and a UE Rx-Tx positioning measurement within each of the multiple measurement and processing timelines may be performed and reported to the mobile wireless communication network.

15. The method of claim 14, wherein a positioning reference signal ("PRS") measurement and processing timeline duration for the UE may comprise:
 a single value in response to positioning measurements being performed at a same time; and
 multiple values in response to positioning measurements being performed sequentially.

16. The method of claim 13, further comprising receiving pre-configured assistance data for positioning from the mobile wireless communication network during a Long-term evolution Protocol Positioning ("LPP") session and performing measurements and processing on the pre-configured assistance data in response to the transceiver receiving an LPP Request Location Information message.

17. The method of claim 13, further comprising receiving the positioning configuration from the mobile wireless communication network via a broadcast signal, the positioning configuration designed for a plurality of UEs with same capabilities.

18. The method of claim 13, further comprising receiving the positioning configuration from the mobile wireless communication network via a UE-specific dedicated signal, the UE-specific dedicated signal comprising a medium access control ("MAC") control element ("CE") or radio resource control ("RRC") signaling message.

19. An apparatus, comprising:
   a processor; and
   a memory coupled with the processor, the memory comprising instructions executable by the processor to cause the apparatus to:
      send, to a User Equipment ("UE") device, a positioning configuration defining a positioning configuration timeline and a measurement and processing time window for the UE, the positioning configuration comprising a timeline duration defining when to start performing measurements, a set of positioning measurements to be taken within the configured time window, and a window duration for measuring and processing requested position-relation measurements for the UE according to the positioning processing timeline; and
      receive, from the UE device, a positioning measurement report comprising the at least one positioning measurement and measurement timeline of the at least one positioning measurement performed within the configured time window.

20. The apparatus of claim 19, wherein the positioning configuration timeline is determined as a function of different individual timelines associated with configuration of assistance data, measurements, processing, and calculation of the UE's position estimate.

* * * * *